(12) United States Patent
Katsumata et al.

(10) Patent No.: US 11,812,147 B2
(45) Date of Patent: Nov. 7, 2023

(54) APPARATUS AND CONTROL METHOD THEREOF

(71) Applicant: CANON KABUSHIKI KAISHA, Tokyo (JP)

(72) Inventors: Momoe Katsumata, Tokyo (JP); Takashi Sugie, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 83 days.

(21) Appl. No.: 17/671,155

(22) Filed: Feb. 14, 2022

(65) Prior Publication Data

US 2022/0279126 A1 Sep. 1, 2022

(30) Foreign Application Priority Data

Feb. 26, 2021 (JP) ................. 2021-030208

(51) Int. Cl.
*H04N 23/68* (2023.01)
*H04N 23/54* (2023.01)

(52) U.S. Cl.
CPC .......... *H04N 23/687* (2023.01); *H04N 23/54* (2023.01); *H04N 23/683* (2023.01)

(58) Field of Classification Search
CPC .... H04N 23/687; H04N 23/54; H04N 23/683; H04N 23/651; H04N 23/667; H04N 23/52
USPC ...................................... 348/208.5
See application file for complete search history.

(56) References Cited

FOREIGN PATENT DOCUMENTS

| EP | 2 477 389 | * | 7/2012 | ............. H04N 23/54 |
| JP | 2009-278584 | * | 11/2009 | |
| JP | 2009278584 | A | 11/2009 | |
| JP | 2014059551 | A | 4/2014 | |

* cited by examiner

*Primary Examiner* — Lin Ye
*Assistant Examiner* — Chan T Nguyen
(74) *Attorney, Agent, or Firm* — CANON U.S.A., INC. IP Division

(57) ABSTRACT

An apparatus includes a sensor, a movable portion configured to hold the sensor and move in a direction perpendicular to an optical axis, a holding unit configured to gradually change a holding force for holding the movable portion by moving back and forth in the direction of the optical axis, and a control unit configured to control the holding force of the holding unit for holding the movable portion depending on a state of the apparatus.

20 Claims, 16 Drawing Sheets

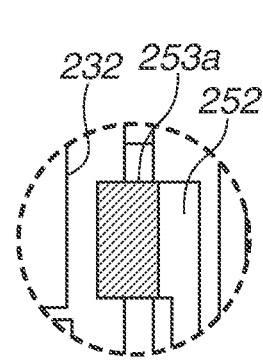 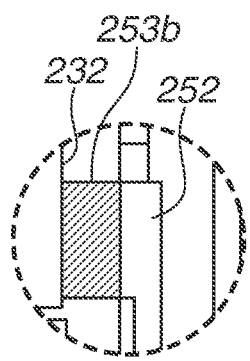 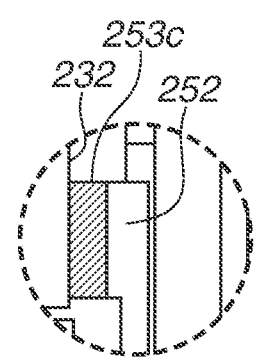

APPARATUS AND CONTROL METHOD THEREOF

BACKGROUND

Field of the Disclosure

The aspect of the embodiments relates to an image sensor holding mechanism for holding an image sensor movable in a direction perpendicular to an imaging optical axis.

Description of the Related Art

In recent years, a technique for correcting blurring in an object image (hereinafter, called "image blurring") caused by a shake occurring in an image capturing apparatus has been widely used. There is provided an image blurring correction method for correcting image blurring by moving a part of an optical system functioning as a correction optical system in a direction perpendicular to an imaging optical axis depending on a detected shake. Further, there is also provided another image blurring correction method called "image sensor shifting-type image blurring correction method" for correcting image blurring by moving an image sensor in a direction perpendicular to an imaging optical axis depending on a detected shake.

In a case of using the image sensor shifting-type image blurring correction method, there has been conventionally an issue that the impact resistance of the image sensor is impaired because a position of the image sensor is not fixed when image sensor shifting-type image blurring correction is not executed. Further, power is to be constantly supplied to a coil to maintain the position of the image sensor even in a state where image blurring correction is not required during image capturing, thereby causing an increase in power consumption.

According to a technique discussed in Japanese Patent Application Laid-Open No. 2014-59551, an image sensor is held at an arbitrary position with pressing force applied thereto, so that positional deviation of the image sensor can be controlled even if supply of power to a coil is stopped.

Meanwhile, there are known a technique for cooling down an image capturing unit and a technique for absorbing heat from an image sensor. Japanese Patent Application Laid-Open No. 2009-278584 discusses a technique for causing a heat dissipation member to move between a first position where the heat dissipation member is in contact with an image capturing unit and a second position where the heat dissipation member is separated from the image capturing unit. When image capturing is not executed, the heat dissipation member is located at the first position to facilitate dissipation of heat from the image capturing unit.

However, in the conventional technique discussed in Japanese Patent Application Laid-Open No. 2014-59511, the pressing force for holding the image capturing unit is not described. If the pressing force is too strong, there is a possibility that the position of the image sensor in the imaging optical axis direction (i.e., flange focal distance) is changed because of slight deformation or inclination of the image capturing unit.

Further, in the conventional technique discussed in Japanese Patent Application Laid-Open No. 2009-278584, the heat dissipation member is separated from the image capturing unit when image capturing is executed. Therefore, heat cannot be dissipated during an image capturing operation in which the image sensor generates heat.

SUMMARY OF THE DISCLOSURE

An apparatus includes a sensor, a movable portion configured to hold the sensor and move in a direction perpendicular to an optical axis, a holding unit configured to gradually change a holding force for holding the movable portion by moving back and forth in the direction of the optical axis, and a control unit configured to control the holding force of the holding unit for holding the movable portion depending on a state of the apparatus.

Further features of the disclosure will become apparent from the following description of exemplary embodiments with reference to the attached drawings.

DESCRIPTION OF THE EMBODIMENTS

Figure 1:
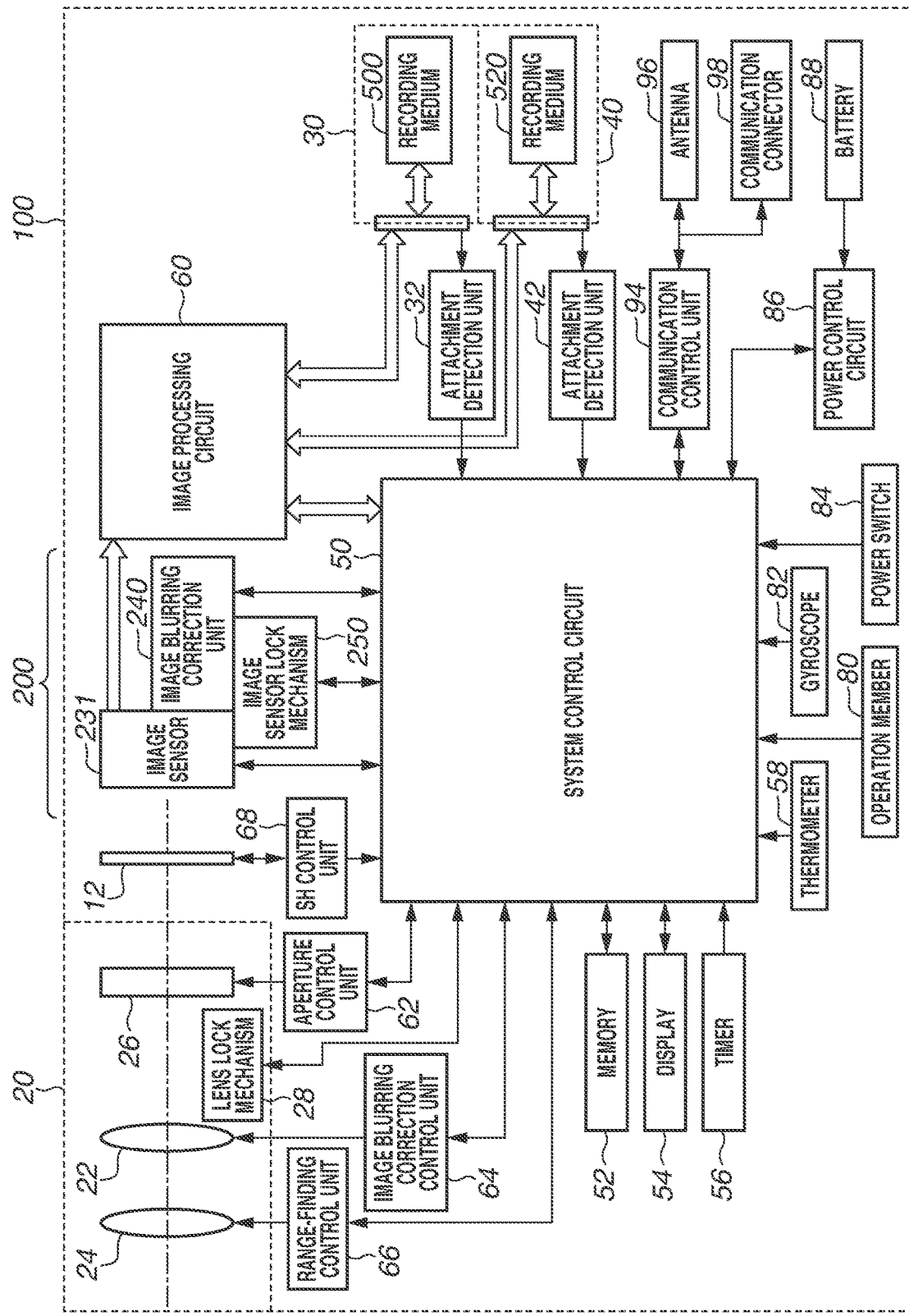
FIG. 1 is a block diagram illustrating an internal configuration of a digital camera according to an exemplary embodiment of the disclosure.

Hereinafter, an exemplary embodiment of the disclosure will be described with reference to the appended drawings. First, an internal configuration of a digital camera 100 according to a first exemplary embodiment of the disclosure will be described with reference to FIG. 1. FIG. 1 is a block diagram illustrating the internal configuration of the digital camera 100.

A shutter 12 is a light-shielding member which opens and closes to control an exposure amount of an image sensor 231. A flux of light incident on an image capturing lens 20 is introduced to the image sensor 231 via an aperture 26 and the shutter 12 to form an optical image on an imaging plane of the image sensor 231.

An image capturing unit 200 includes an image sensor unit 230 (FIG. 2) and an image blurring correction unit 240. The image sensor unit 230 includes the image sensor 231 which converts an optical image into an electric signal.

The image blurring correction unit 240 executes image blurring correction through an image sensor shifting method to correct image blurring by moving the image sensor 231 in a direction perpendicular to an imaging optical axis depending on a shake amount detected by a gyroscope 82. A known method can be employed as a method for calculating a moving amount of the image sensor 231 from a shake amount detected by the gyroscope 82, so that detailed description thereof will be omitted.

When the image blurring correction unit 240 does not execute the correction, an image sensor lock mechanism 250 holds the image sensor unit 230 to maintain a position of the image sensor 231.

An optical image blurring correction control unit 64 controls a correction lens 22 to correct image blurring by moving the correction lens 22 in a direction perpendicular to the imaging optical axis depending on a shake amount detected by the gyroscope 82. A known method can be employed as a method for calculating a moving amount of the correction lens 22 based on a shake amount detected by the gyroscope 82, so that detailed description thereof will be omitted.

When correction is not executed by using the correction lens 22, a lens lock mechanism 28 holds the correction lens 22 to maintain the position thereof.

A first card slot 30 is a first card slot for a recording medium 500. An attachment detection unit 32 detects the recording medium 500 when the recording medium 500 is attached to the first card slot 30. A second card slot 40 is a second card slot for a recording medium 520. An attachment detection unit 42 detects the recording medium 520 when the recording medium 520 is attached to the second card slot 40.

A system control circuit 50 is a system control circuit such as a central processing unit (CPU) which controls the entirety of the digital camera 100. A constant number, a variable number, and a program used for the operation of the system control circuit 50 are stored in a memory 52.

The system control circuit 50 executes setting processing, determination processing, and control processing when the digital camera 100 performs various operations. An image processing circuit 60 performs a calculation process on image data captured and acquired by the image sensor 231. Based on a result of the calculation performed by the image processing circuit 60, the system control circuit 50 executes auto-focus (AF) processing and auto-exposure (AE) processing by controlling the shutter 12, the lenses 22 and 24, and the aperture 26. Further, the holding state of the image sensor unit 230 held by the image sensor lock mechanism 250 is also stored in the memory 52.

A timer 56 measures an elapsed time, and a thermometer 58 measures a temperature of the image sensor 231. An operation member 80 includes various buttons and switches, and a user operates the operation member 80 to select and set various functions for executing image capturing, image reproduction, and communication, and to input instructions relating to image capturing and image reproduction.

The gyroscope 82 detects an angular speed as information about a shake of the digital camera 100.

A power on state and a power off state of the digital camera 100 are switched and set by a power switch 84.

A power control circuit 86 includes a battery detection circuit, a direct current-to-direct current (DC/DC) converter, and a switch circuit for switching a block to which power is supplied. The power control circuit 86 detects a type and a remaining amount of a battery 88 serving as a power source of the digital camera 100, and supplies necessary voltage to each unit such as the recording medium 500 (520) for a necessary period based on the detection result and an instruction from the system control circuit 50.

A communication control unit 94 executes control of wireless communication established with an external device (not illustrated) via an antenna 96 and wired communication established with an external device (not illustrated) via a communication connector 98.

The recording media 500 and 520 are recording media such as a secure digital (SD) card, a compact flash (CF) card, and a CFexpress card for storing acquired image data. Each of the recording media 500 and 520 includes a recording area configured of a semiconductor memory, an interface with the digital camera 100, and a connector for connecting to the digital camera 100.

Figure 2:
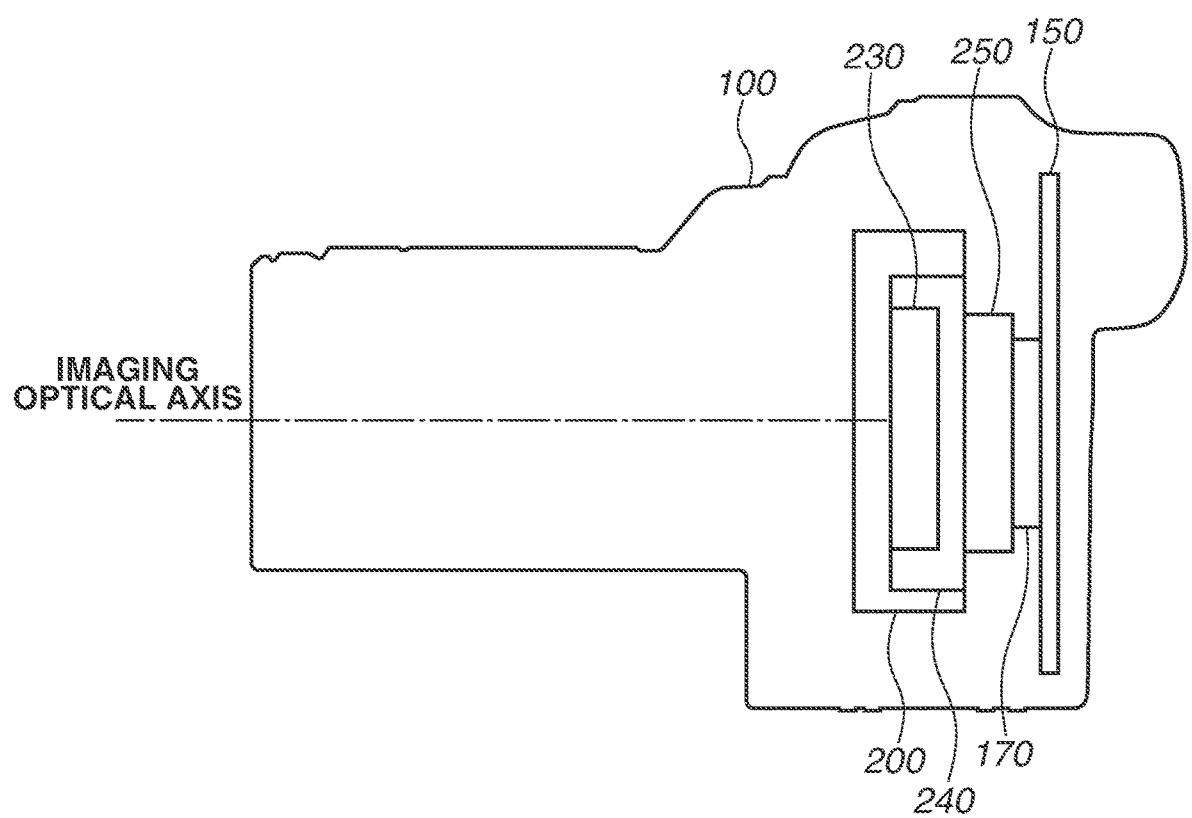
FIG. 2 is a side view illustrating a configuration of the digital camera.

FIG. 2 is a side view illustrating a configuration of the digital camera 100.

The image sensor lock mechanism 250 is arranged on a back face side of the image capturing unit 200 (i.e., a user side) for maintaining the position of the image sensor unit 230 when the image blurring correction unit 240 is not activated. Further, a chassis 150 serving as a housing of the digital camera 100 is also arranged on the back face side of the image capturing unit 200. A heat-transfer member 170 formed of a member having high thermal conductivity is arranged between the chassis 150 and the image sensor lock mechanism 250 to abut on both of the chassis 150 and the image sensor lock mechanism 250. Alternatively, the chassis 150 and the image sensor lock mechanism 250 may be configured to directly abut on each other.

Figure 3A:
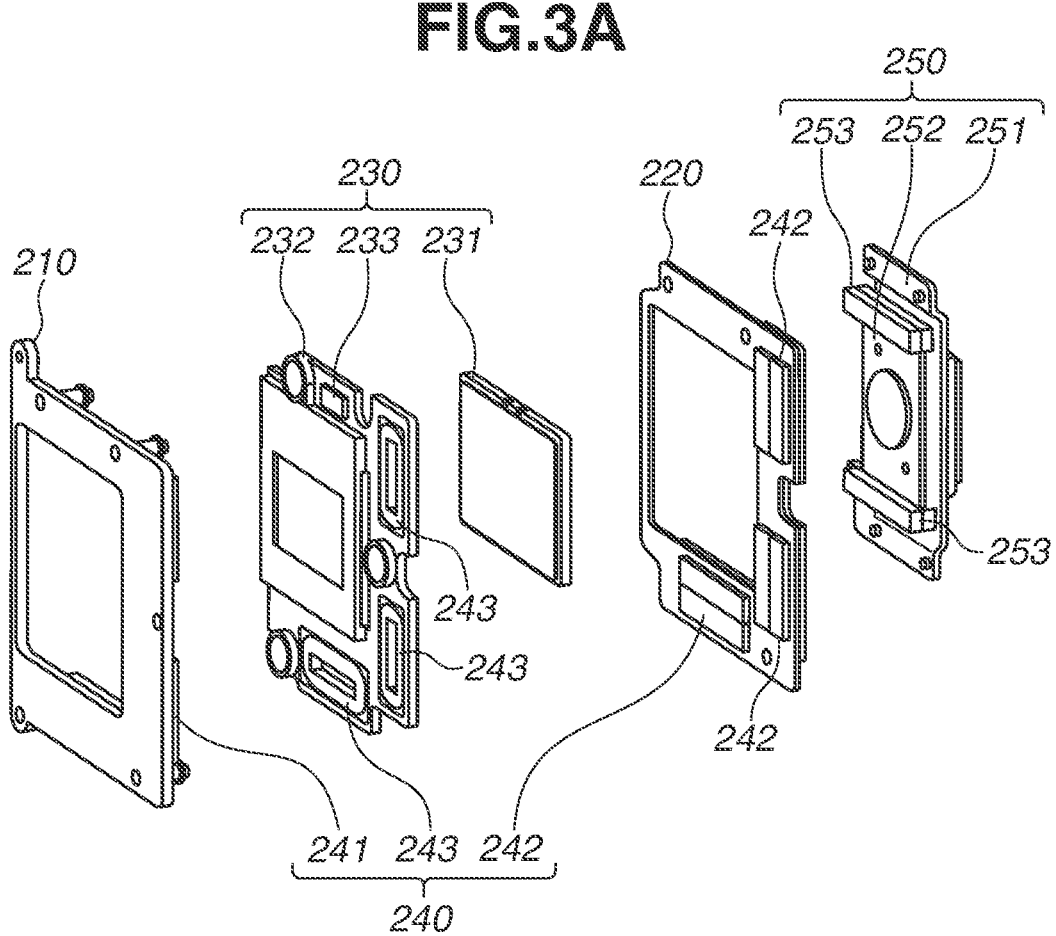
FIGS. 3A and 3B are exploded perspective views of an image capturing unit and an image sensor lock mechanism.
Figure 3B:
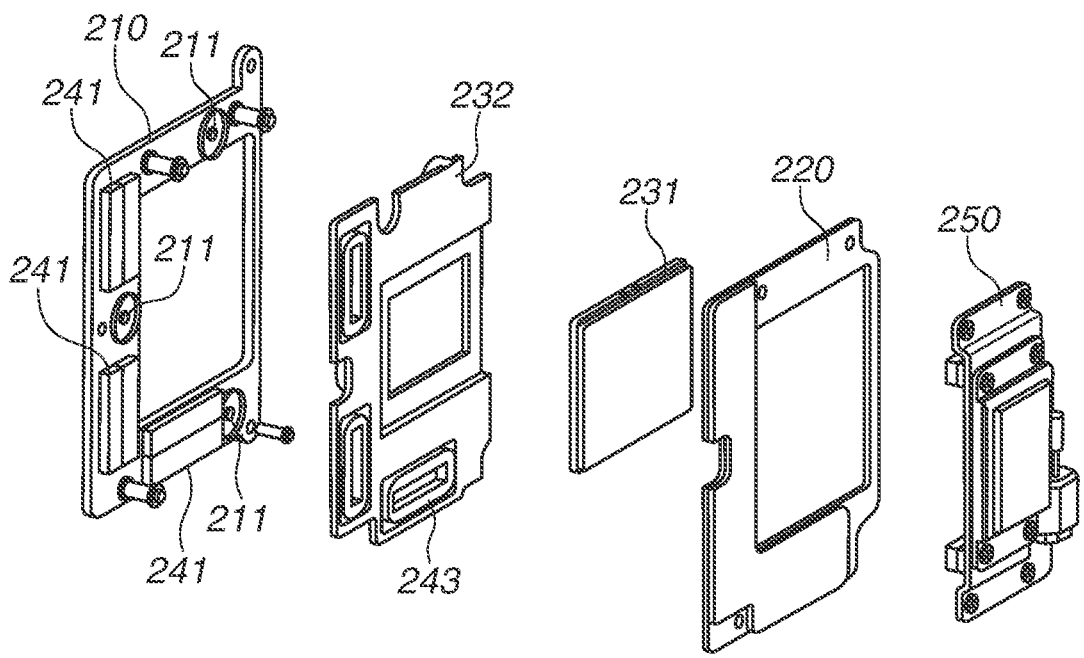

Next, configurations of the image capturing unit 200 and the image sensor lock mechanism 250 will be described with reference to FIGS. 3A and 3B. FIGS. 3A and 3B are exploded perspective views of the image capturing unit 200 and the image sensor lock mechanism 250. Specifically, FIG. 3A is an anterior perspective view when viewed from an object side, whereas FIG. 3B is a posterior perspective view when viewed from the user side.

The image capturing unit 200 is configured such that the image sensor unit 230 is arranged between a front face plate 210 and a back face plate 220 formed of metallic plates. The front face plate 210 is fixed to a structure (not illustrated)

inside the digital camera 100, and the back face plate 220 is fixed to the front face plate 210 with the image sensor unit 230 therebetween.

The image sensor unit 230 includes the image sensor 231 and an image sensor holder 232 for holding the image sensor 231. Three balls 211 are arranged between the front face plate 210 and the image sensor holder 232 at positions in the circumference of the image sensor 231 to surround an imaging optical axis. By making the balls 211 freely roll over, the image sensor unit 230 is movably held in a direction perpendicular to the imaging optical axis at a position between the front face plate 210 and the back face plate 220. In other words, with respect to the front face plate 210 and the back face plate 220 serving as fixing portions, the image sensor unit 230 serving as a movable portion is movable in a direction perpendicular to the imaging optical axis.

Further, a magnet 233 is arranged on the image sensor holder 232 to attract the front face plate 210, so that the front face plate 210, the image sensor holder 232, and the balls 211 are in contact with each other. With this configuration, the image sensor 231 is fixed at a prescribed flange-back position in the digital camera 100.

Subsequently, the image blurring correction unit 240 will be described. Magnets 241 and 242 are respectively arranged on the front face plate 210 and the back face plate 220 to face each other. Further, coils 243 are arranged at respective positions on the image sensor holder 232 so as to be held between the magnets 241 and 242. Power is supplied to the coils 243 from a power supply circuit (not illustrated), and driving control of the image sensor unit 230 is executed by using magnetic fields generated in the coils 243 and repulsive force and attractive force of the magnets 241 and 242.

The image blurring correction unit 240 executes control for moving the image sensor unit 230 in a direction in which a shake of the digital camera 100 caused by a user is cancelled.

Next, the image sensor lock mechanism 250 will be described. A lock mechanism base 251, i.e., a base member of the image sensor lock mechanism 250, is attached to the back face plate 220, so that the image sensor lock mechanism 250 is arranged on the back face side of the image sensor unit 230.

Further, a lock plate 252 held by the lock mechanism base 251 moves back and forth in a direction of the imaging optical axis of the image sensor 231, so that a state of the image sensor lock mechanism 250 is switched between a holding state where lock rubbers 253 arranged on the lock plate 252 abut on the image sensor holder 232 and a non-holding state where the lock rubbers 253 are separated from the image sensor holder 232. In a state where the lock rubbers 253 abut on the image sensor holder 232, a movement of the image sensor holder 232 in a direction perpendicular to the imaging optical axis is regulated because of the frictional force between the contact faces. In other words, the image sensor lock mechanism 250 is arranged to be juxtaposed with the image sensor unit 230 in a direction of the imaging optical axis, and functions as a holding unit for holding the image sensor unit 230 by moving back and forth in a direction of the imaging optical axis.

Thus, as long as the image sensor lock mechanism 250 is in the holding state, a position of the image sensor holder 232 can be maintained at a desired position even if the supply of power to the coils 243 is stopped.

Figure 4:
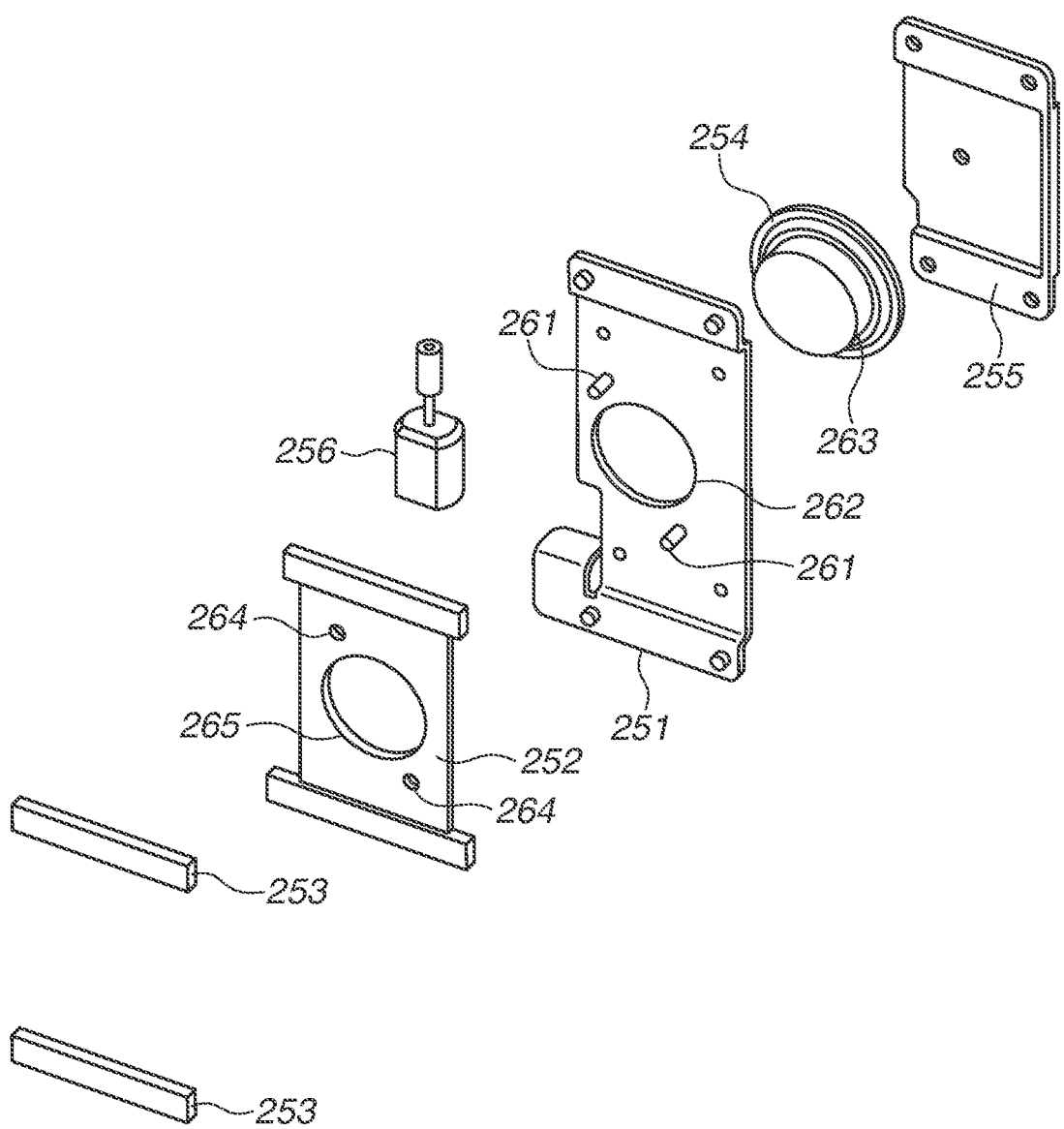
FIG. 4 is an anterior exploded perspective view of the image sensor lock mechanism.

Next, details of the image sensor lock mechanism 250 will be described with reference to FIG. 4. FIG. 4 illustrates an anterior perspective view of the image sensor lock mechanism 250. Hereinafter, a direction of the imaging optical axis is also called "optical axis direction".

Guide pins 261 are arranged on the lock mechanism base 251, and fit into guide holes 264 formed on the lock plate 252 to guide the lock plate 252 when the lock plate 252 moves back and forth in the optical axis direction. Further, a gear holding hole 262 is formed on the lock mechanism base 251, and a cam gear 254 is arranged inside the gear holding hole 262. The cam gear 254 is held by a gear cover 255 on a back face side thereof, and rotationally moved by an actuator 256 arranged on the lock mechanism base 251. By combining a cam portion 263 arranged on the cam gear 254 and a cam portion 265 arranged on the lock plate 252, a rotary movement of the cam gear 254 is converted to a translatory movement of the lock plate 252. With this configuration, the lock plate 252 moves back and forth in the optical axis direction, so that the state of the image sensor lock mechanism 250 can be switched between the holding state where the lock rubbers 253 arranged on the lock plate 252 abut on the image sensor holder 232 and the non-holding state where the lock rubbers 253 are separated from the image sensor holder 232.

Figure 5A:
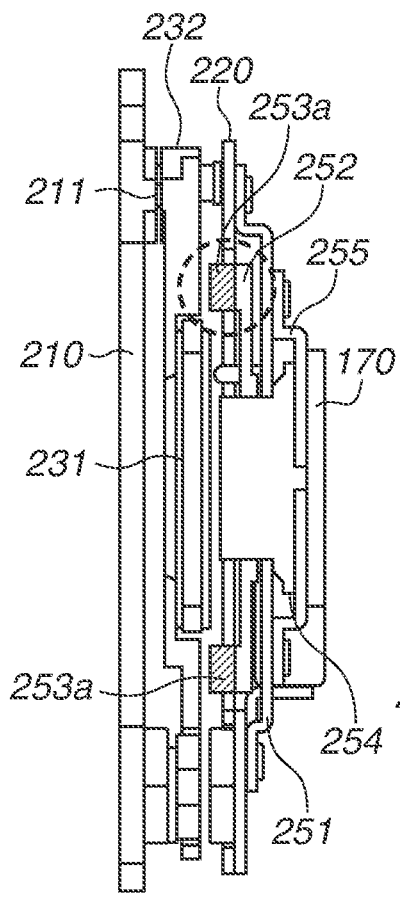
FIGS. 5A, 5B, and 5C are cross sectional views illustrating the image capturing unit and the image sensor lock mechanism.
Figure 5B:
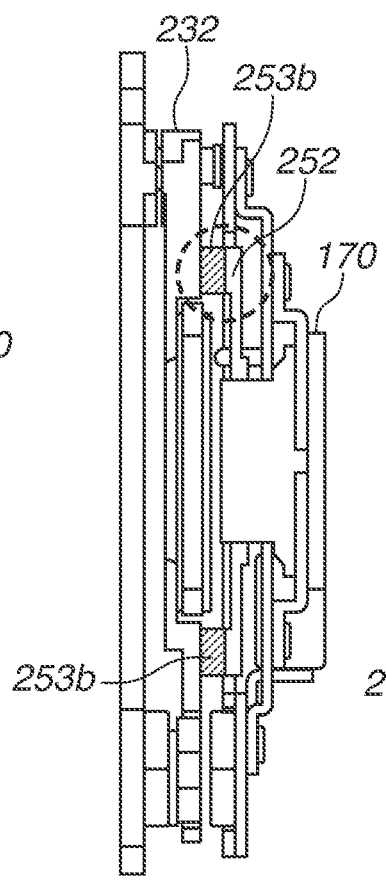
Figure 5C:
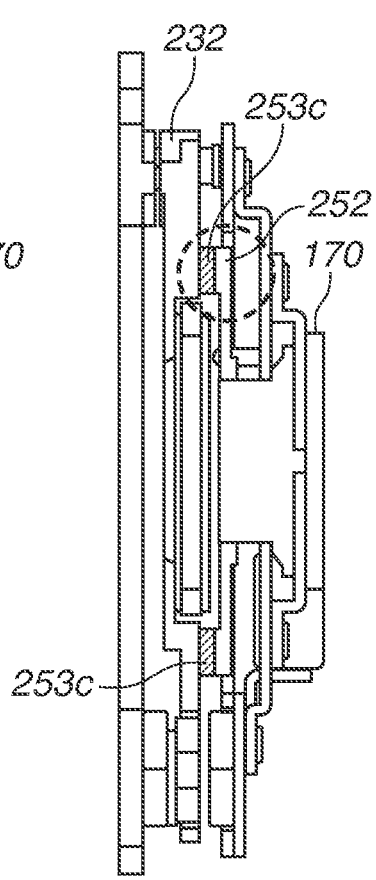

Next, movement of the image sensor lock mechanism 250 according to the disclosure will be described with reference to FIGS. 5A to 5C. FIGS. 5A to 5C are diagrams illustrating cross-sectional views and partially-enlarged cross-sectional views of the image capturing unit 200 and the image sensor lock mechanism 250. FIG. 5A illustrates a non-holding state of the image sensor unit 230. A lock rubber 253 in this state is called "lock rubber 253a". The lock rubbers 253a are separated from the image sensor holder 232. In this state, the image sensor unit 230 can be moved in a direction perpendicular to the imaging optical axis, so that the image blurring correction unit 240 can control the position of the image sensor 231 in the imaging optical axis.

Each of FIGS. 5B and 5C illustrates a holding state of the image sensor unit 230. The lock plate 252 moves close to the image sensor holder 232, so that the lock rubbers 253 abut on the image sensor holder 232. In this state, a position of the image sensor holder 232 is fixed because of the frictional force between the image sensor holder 232 and the lock rubbers 253. Therefore, even if the image blurring correction unit 240 is not in operation, a position of the image sensor unit 230 can be maintained at a desired position.

FIG. 5B illustrates a holding state (first holding state) where the urging force of the lock rubbers 253 applied to the image sensor holder 232 is a first urging force. The lock rubber 253 in this state is called "lock rubber 253b". FIG. 5C illustrates a holding state (second holding state) where the urging force of the lock rubbers 253 applied to the image sensor holder 232 is a second urging force. A lock rubber 253 of this state is called "lock rubber 253c".

In the first holding state, a charge amount of the lock rubber 253b is smaller than a charge amount of the lock rubber 253c in the second holding state. Therefore, the urging force of the lock rubber 253b applied to the image sensor holder 232 is weaker than the urging force of the lock rubber 253c applied to the image sensor holder 232.

In a state where the digital camera 100 is attached to a tripod stand, i.e., in a state where a frequency of occurring a shake in the digital camera 100 is comparatively low, the image sensor unit 230 is prevented from being moved by gravitational force with frictional force generated between the image sensor holder 232 and the lock rubbers 253. There is a possibility that the image sensor unit 230 is slightly deformed or inclined if strong urging force is applied to the image sensor holder 232 from the lock rubbers 253 to increase the frictional force. Therefore, in the first holding state, the first urging force is set to a certain intensity that prevents the image sensor unit 230 from being moved by the gravitational force and does not cause such slight deformation of the image sensor unit 230.

Therefore, in the first holding state, even if the urging force is applied to the image sensor holder 232, displacement in the optical axis direction which causes degradation of image resolution of the image sensor 231 does not occur. Further, the lock rubbers 253 are arranged on the upper or the lower portions so that the centroid of the balls 211 is located therebetween. With this configuration, it is possible to prevent inclination of the image sensor holder 232 caused by the urging force.

As described above, when the image blurring correction unit 240 is not in operation, a good quality image can be captured by setting the first holding state.

A charge amount of the lock rubber 253c in the second holding state is greater than a charge amount of the lock rubber 253b in the first holding state. Thus, the urging force of the lock rubber 253c applied to the image sensor holder 232 is stronger than the urging force applied thereto in the first holding state. In the second holding state, the second urging force is set thereto in order to prevent the image sensor unit 230 from being moved even if acceleration caused by the external force occurs in the image capturing unit 200.

As described above, when the image blurring correction unit 240 is not in operation, the impact-resistance at the periphery of the image capturing unit 200 can be improved by setting the holding state to the second holding state. In other words, the image sensor lock mechanism 250 can gradually change the holding force for holding the image sensor unit 230.

Further, the image sensor lock mechanism 250 is thermally connected to the chassis 150 via the heat-transfer member 170 arranged on the back face side thereof. In the first and the second holding states, thermal energy generated from the image sensor 231 is transmitted to the image sensor lock mechanism 250 via the image sensor holder 232 and the lock rubber 253, and can be exhausted to the chassis 150 via the heat-transfer member 170.

Though the above-described configuration, the digital camera 100 according to the present exemplary embodiment can prevent a rise in temperature of the image sensor 231 while maintaining the position of the image sensor 231 by holding the image sensor unit 230. Further, the image sensor unit 230 can be held in the first holding state and the second holding state where urging force of different intensities are applied thereto, so that the image sensor 231 can be held depending on a purpose (e.g., to prevent degradation of image quality or to improve the impact-resistance at the periphery of the image capturing unit 200) or a state of the image capturing apparatus.

Hereinafter, examples of processing for selecting a state of the image sensor lock mechanism 250 from any one of the first holding state, the second holding state, and the non-holding state will be described. Hereinafter, processing for changing the state of the image sensor lock mechanism 250 depending on a setting or a state of the digital camera 100 will be described with reference to FIGS. 6 to 11.

Figure 6:
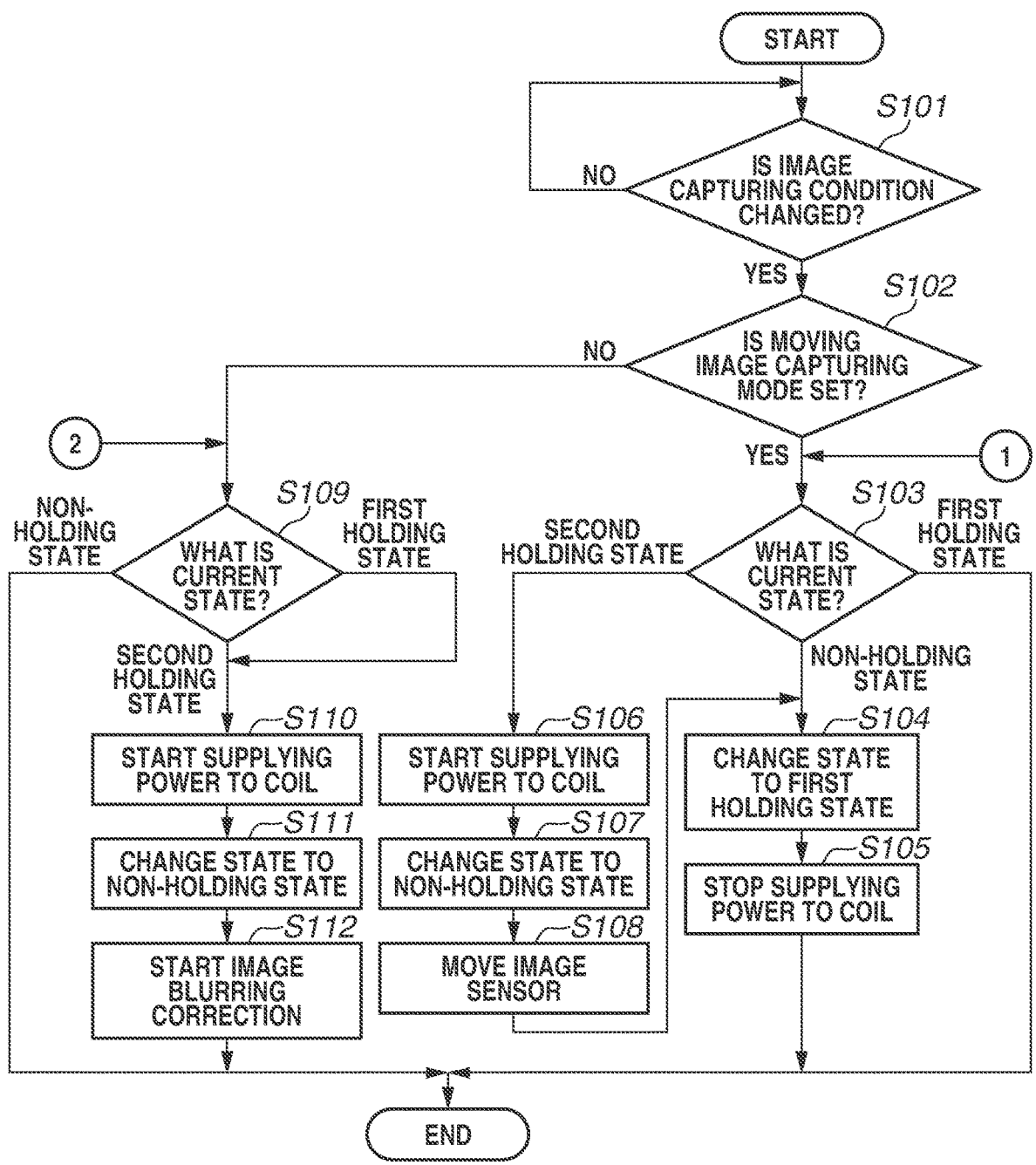
FIG. 6 is a flowchart illustrating processing to be executed when a moving image capturing mode is set to the digital camera.

FIG. 6 is a flowchart illustrating processing executed when a moving image capturing mode is set to the digital camera 100. The processing illustrated in FIG. 6 is started when the digital camera 100 is turned on.

First, in step S101, the system control circuit 50 determines whether the user operates the operation member 80 to change the image capturing condition. If the system control circuit 50 determines that the image capturing condition is not changed (NO in step S101), the system control circuit 50 repeatedly executes the determination until the image capturing condition is changed.

If the system control circuit 50 determines that the image capturing condition is changed (YES in step S101), the processing proceeds to step S102. In step S102, the system control circuit 50 determines whether the image capturing condition is changed to a moving image capturing mode.

If the system control circuit 50 determines that change of the image capturing condition to the moving image capturing mode is executed (i.e., setting of the moving image capturing mode is executed) (YES in step S102), the processing proceeds to step S103. In step S103, the system control circuit 50 determines a state of the image sensor lock mechanism 250.

If the system control circuit 50 determines that the image sensor lock mechanism 250 is in the non-holding state ("NON-HOLDING STATE" in step S103), the processing proceeds to step S104. In step S104, the system control circuit 50 controls the image sensor lock mechanism 250 to bring the image sensor lock mechanism 250 into the first holding state. Then, in step S105, the system control circuit 50 stops the supply of power to the coils 243, and ends the processing for changing the state of the image sensor lock mechanism 250 executed when the image capturing condition is changed.

In step S103, in a case where the system control circuit 50 determines that the image sensor lock mechanism 250 is in the first holding state ("FIRST HOLDING STATE" in step S103), the system control circuit 50 ends the processing without changing the state of the image sensor lock mechanism 250.

In step S103, if the system control circuit 50 determines that the image sensor lock mechanism 250 is in the second holding state ("SECOND HOLDING STATE" in step S103), the processing proceeds to step S106. In step S106, the system control circuit 50 starts the supply of power to the coils 243. Then, in step S107, the system control circuit 50 controls the image sensor lock mechanism 250 to bring the image sensor lock mechanism 250 into the non-holding state. Next, in step S108, the system control circuit 50 starts the operation of the image blurring correction unit 240, and moves the image sensor unit 230 based on the information (e.g., information about individual differences) received from the image capturing lens 20. Thereafter, the processing proceeds to step S104.

As described above, the holding state of the image sensor lock mechanism 250 is first changed to the non-holding state before being changed to the first holding state from the second holding state, so that the image sensor unit 230 can be held at a position that takes into account the information (e.g., information about individual differences) from the image capturing lens 20.

In step S102, in a case where the system control circuit 50 determines that change of the image capturing condition to an image capturing mode other than the moving image capturing mode is executed (i.e., setting of an image capturing mode other than the moving image capturing mode is executed) (NO in step S102), the processing proceeds to step S109. In step S109, the system control circuit 50 determines a state of the image sensor lock mechanism 250.

In step S109, in a case where the system control circuit 50 determines that the image sensor lock mechanism 250 is in the first holding state or the second holding state ("FIRST HOLDING STATE" or "SECOND HOLDING STATE" in step S109), the processing proceeds to step S110. In step S110, the system control circuit 50 starts the supply of power to the coils 243. Then, in step S111, the system control circuit 50 controls the image sensor lock mechanism 250 to bring the image sensor lock mechanism 250 into the non-holding state. In step S112, the system control circuit 50 starts the operation of the image blurring correction unit 240, and ends the processing for changing the state of the image sensor lock mechanism 250.

In step S109, in a case where the system control circuit 50 determines that the image sensor lock mechanism 250 is in the non-holding state ("NON-HOLDING STATE" in step S109), the system control circuit 50 ends the processing without changing the state of the image sensor lock mechanism 250.

The present exemplary embodiment has been described based on the case where the moving image capturing mode is selected as the image capturing condition. However, the image sensor lock mechanism 250 may be brought into the first holding state when another image capturing mode other than the moving image mode is selected. For example, control similar to the control executed when the moving image capturing mode is selected may be executed in a case where an image capturing mode using a tripod stand in which frequency of occurrence of a camera shake is comparatively low is selected, or in a case where a long exposure image capturing mode or an interval image capturing mode in which the user frequently executes image capturing using a tripod stand is selected. In the above-described image capturing modes, because frequency of occurrence of a camera shake is comparatively low, the urging force of the image sensor lock mechanism 250 does not need to be strong. Thus, the first holding state where the power consumption can be suppressed to be lower than the power consumption in the non-holding state is effective. Further, in comparison to the normal still image capturing mode, a temperature of the image sensor 231 is likely to rise in the long-time exposure image capturing mode and the interval image capturing mode. Thus, the first holding state is effective because heat can be dissipated via the image sensor lock mechanism 250.

Further, in a case where the image sensor lock mechanism 250 is determined to be in the second holding state in step S103, the holding state is shifted first to the non-holding state and then to the first holding state. However, the second holding state may be directly shifted to the first holding state. In this case, when the second holding state is being shifted to the first holding state, the supply of power to the coils 243 remains stopped, and the position of the image sensor unit 230 is not changed.

As described above, in a case where the moving image capturing mode is selected, a rise in the temperature of the image sensor 231 can be suppressed by the configuration in which the thermal energy generated from the image sensor 231 is dissipated to the chassis 150 via the image sensor lock mechanism 250 and the heat-transfer member 170. Further, by making the urging force of the image sensor lock mechanism 250 not too strong, displacement of the image sensor 231 in the optical axis direction does not occur, thereby preventing degradation of image quality.

Figure 7:
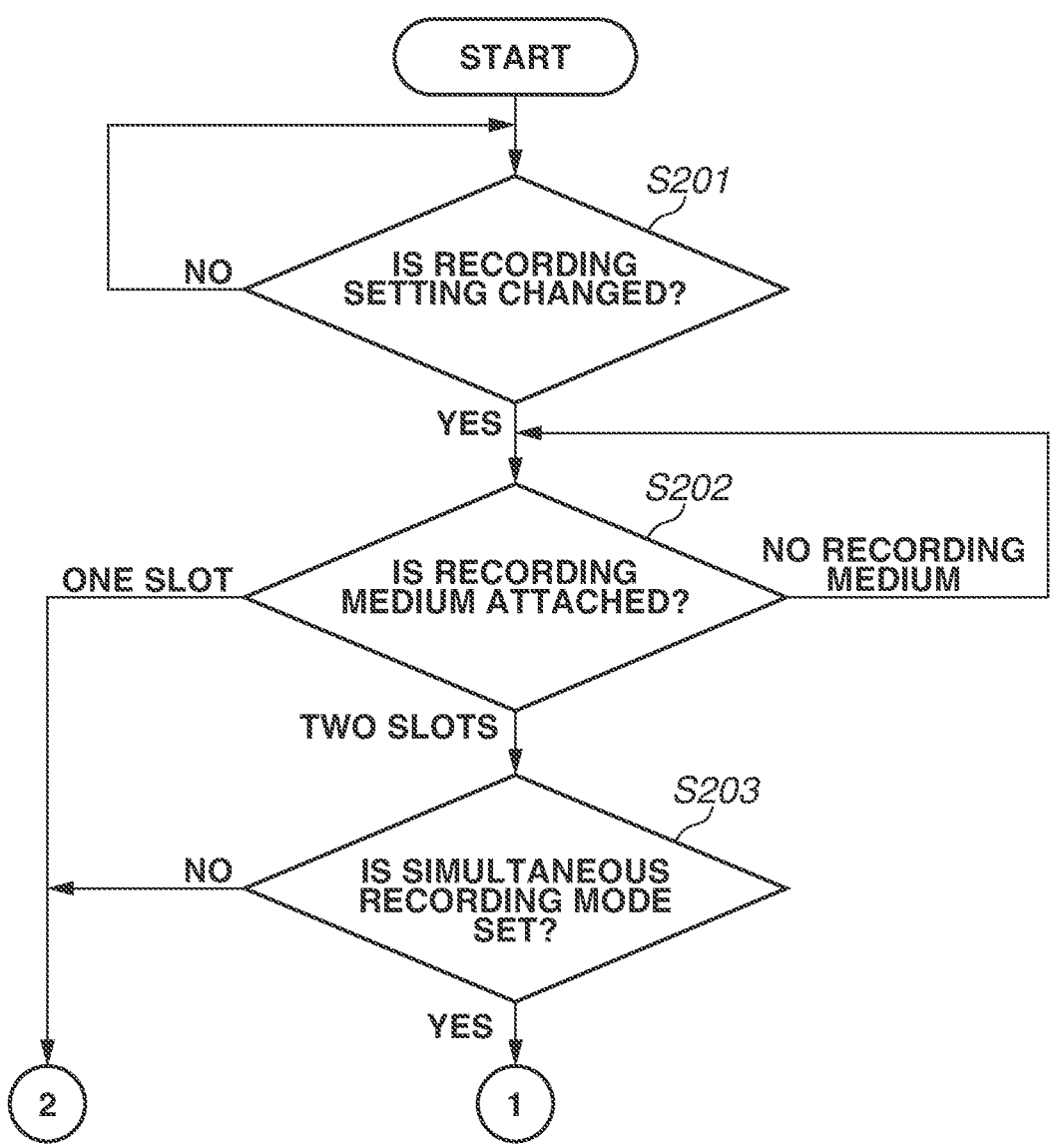
FIG. 7 is a flowchart illustrating processing to be executed depending on a recording mode in a configuration where two recording media are attachable to the digital camera.

Next, with reference to FIGS. 7 to 9, the processing to be executed in a case where the power consumption of the digital camera 100 is likely to increase will be described. FIG. 7 is a flowchart illustrating processing to be executed depending on a recording method in the configuration where two recording media can be attached to the digital camera 100. The processing illustrated in FIG. 7 is started when the digital camera 100 is turned on.

In step S201, the system control circuit 50 determines whether the user operates the operation member 80 to change a recording setting of the recording medium. If the system control circuit 50 determines that the recording setting is not changed (NO in step S201), the system control circuit 50 repeatedly executes the determination until the recording setting is changed.

If the system control circuit 50 determines that the recording setting is changed (YES in step S201), the processing proceeds to step S202. In step S202, the system control circuit 50 controls the attachment detection units 32 and 42 to determine whether recording media are attached to the first and second card slots 30 and 40.

In step S202, in a case where the system control circuit 50 determines that the recording medium is not attached ("NO RECORDING MEDIUM" in step S202), the processing in step S202 is executed repeatedly. In step S202, in a case where the system control circuit 50 determines that a recording medium is attached to any one of the first card slot 30 and the second card slot 40 ("ONE SLOT" in step S202), the processing proceeds to step S109.

In step S202, if the system control circuit 50 determines that recording media are attached to both of the first and the second card slots 30 and 40 ("TWO SLOTS" in step S202), the processing proceeds to step S203. In step S203, the system control circuit 50 determines whether a recording mode is changed to a simultaneous recording mode for recording image data in the two recording media 500 and 520 simultaneously.

In step S203, in a case where the system control circuit 50 determines that the recording mode is changed to the simultaneous recording mode (i.e., the simultaneous recording mode is set) (YES in step S203), the processing proceeds to step S103 in FIG. 6. In a case where the system control circuit 50 determines that the recording mode is changed to a recording mode other than the simultaneous recording mode (NO in step S203), the processing proceeds to step S109 in FIG. 6.

When recording is simultaneously executed on a plurality of recording media, the power consumption of the digital camera 100 becomes higher and a temperature of the housing is more likely to increase compared to the case where recording is executed on a single recording medium. If the temperature of the housing rises, heat dissipation efficiency will be lowered. This may cause occurrence of malfunction in the operation of the digital camera 100. Thus, when the simultaneous recording mode is set, the power consumption is suppressed with the image sensor 231 held by the image sensor lock mechanism 250. In the present exemplary embodiment, the image sensor lock mechanism 250 is caused to be in the first holding state when the simultaneous recording mode is set. However, the image sensor lock mechanism 250 may be caused to be in the second holding state in order to hold the image sensor 231.

Further, in the present exemplary embodiment, recording is simultaneously executed on two recording media in the simultaneous recording mode. However, in the simultaneous recording mode, recording may be simultaneously executed on three or more recording media.

Figure 8:
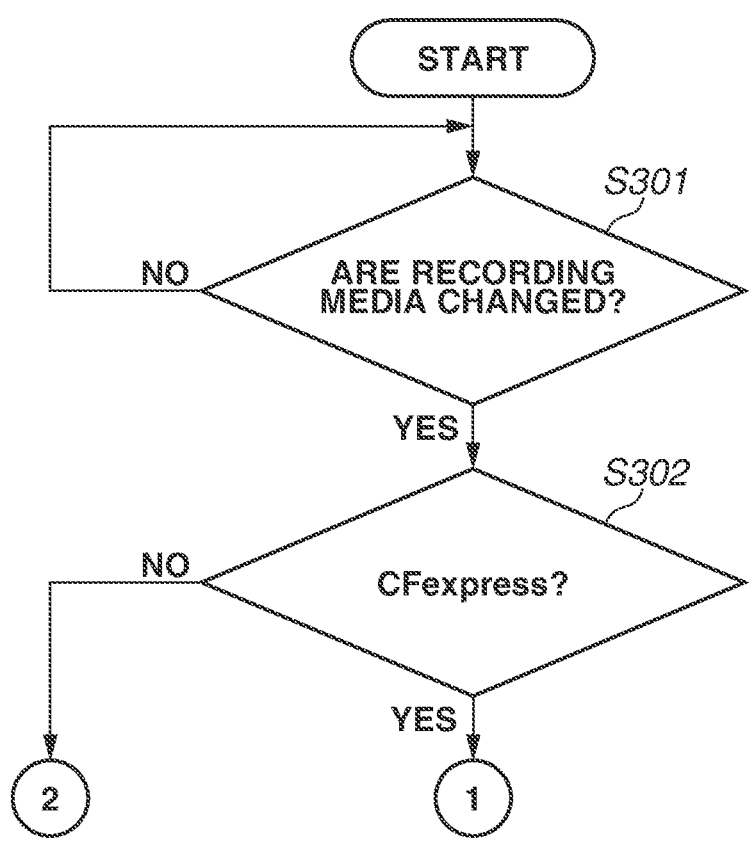
FIG. 8 is a flowchart illustrating processing to be executed depending on a writing speed of a recording medium attached to the digital camera in a configuration where a plurality of types of recording media are attachable to the digital camera.

FIG. 8 is a flowchart illustrating processing to be executed depending on a writing speed of a recording media attached to the digital camera 100 in a configuration where a plurality of types of recording media can be attached thereto. The processing illustrated in FIG. 8 is started when the digital camera 100 is turned on.

In step S301, the system control circuit 50 controls the attachment detection units 32 and 42 to determine whether the recording media attached to the two card slots 30 and 40 are changed. In a case where the system control circuit 50 determines that the recording media are not changed (NO in step S301), the system control circuit 50 repeatedly executes the determination until the recording media are changed.

In step S301, in a case where the system control circuit 50 determines that the recording media are changed (YES in step S301), the processing proceeds to step S302. In step S302, the system control circuit 50 determines whether the recording media attached to the two card slots 30 and 40 are CFexpress cards. If the system control circuit 50 determines that the recording media are CFexpress cards (YES in step S302), the processing proceeds to step S103 in FIG. 6. If the system control circuit 50 determines that the recording media are recording media other than the CFexpress cards (NO in step S302), the processing proceeds to step S109 in FIG. 6.

It is often the case that image data of a large volume of image data is recorded in the CFexpress card because the writing speed of the CFexpress card is higher than that of the SD card, so that the power consumption of the digital camera 100 becomes higher, and the temperature of the housing rises easily. Thus, when the CFexpress card is attached, the power consumption is suppressed with the image sensor 231 held by the image sensor lock mechanism 250. In the present exemplary embodiment, the image sensor lock mechanism 250 is caused to be in the first holding state when the CFexpress cards are attached. However, the image sensor lock mechanism 250 can be caused to be in the second holding state for the purpose of holding the image sensor 231. Further, although the image sensor lock mechanism 250 is caused to be in the first holding state when CFexpress cards are attached to both of the card slots 30 and 40, the image sensor lock mechanism 250 may be caused to be in the first holding state when a CFexpress card is attached to any one of the card slots 30 and 40. Alternatively, the image sensor lock mechanism 250 may be caused to be in the first holding state when a CFexpress card is attached to any one of the card slots 30 and 40 on which recording is executed. Further, similar control may also be executed in a configuration where the digital camera 100 has one card slot. In the present exemplary embodiment, the CFexpress card is used as an example of the recording medium having a high writing speed. However, control similar to the control executed when the CFexpress card is attached may be executed when a recording medium having a writing speed higher than a predetermined writing speed is attached thereto.

Figure 9:
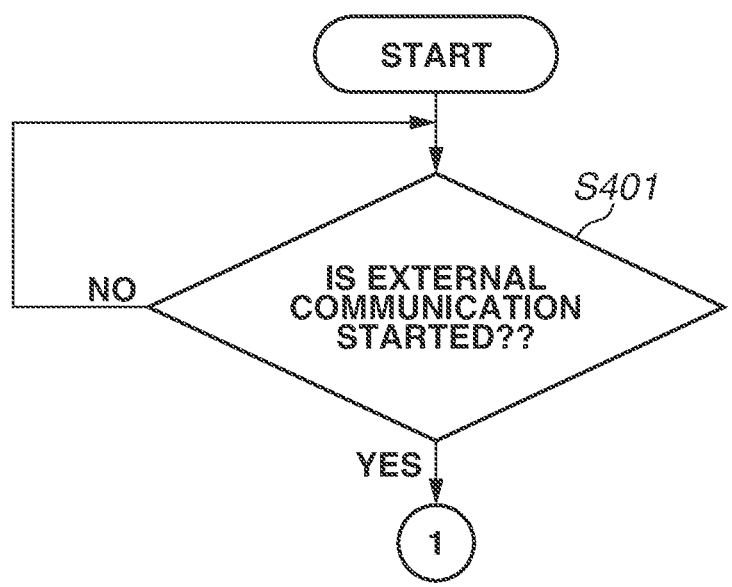
FIG. 9 is a flowchart illustrating processing to be executed when the digital camera capable of communicating with an external device executes communication with an external device.

FIG. 9 is a flowchart illustrating processing to be executed when the digital camera 100 capable of communicating with an external device executes communication with an external device. The processing illustrated in FIG. 9 is started when the digital camera 100 is turned on.

In step S401, the system control circuit 50 determines whether communication is started with an external device (not illustrated) such as a personal computer (PC) or a cloud storage through the communication control unit 94. In a case where the system control circuit 50 determines that communication is not started (NO in step S401), the system control circuit 50 repeatedly executes the determination until communication is started.

In step S401, in a case where the system control circuit 50 determines that communication is started (YES in step S401), the processing proceeds to step S103 in FIG. 6.

When image data is received from and transmitted to an external device through communication with the external device, a circuit other than a control circuit related to image capturing also executes operations, so that the power consumption of the digital camera 100 becomes higher, and the temperature of the housing rises easily.

Therefore, when communication is executed with an external device, the power consumption is suppressed with the image sensor 231 held by the image sensor lock mechanism 250. In the present exemplary embodiment, the image sensor lock mechanism 250 is caused to be in the first holding state when communication is executed with an external device. However, the image sensor lock mechanism 250 can be caused to be in the second holding state for the purpose of holding the image sensor 231. Further, communication may be executed with an external device through any one of wireless communication using the antenna 96 and wired communication using the communication connector 98.

Figure 10:
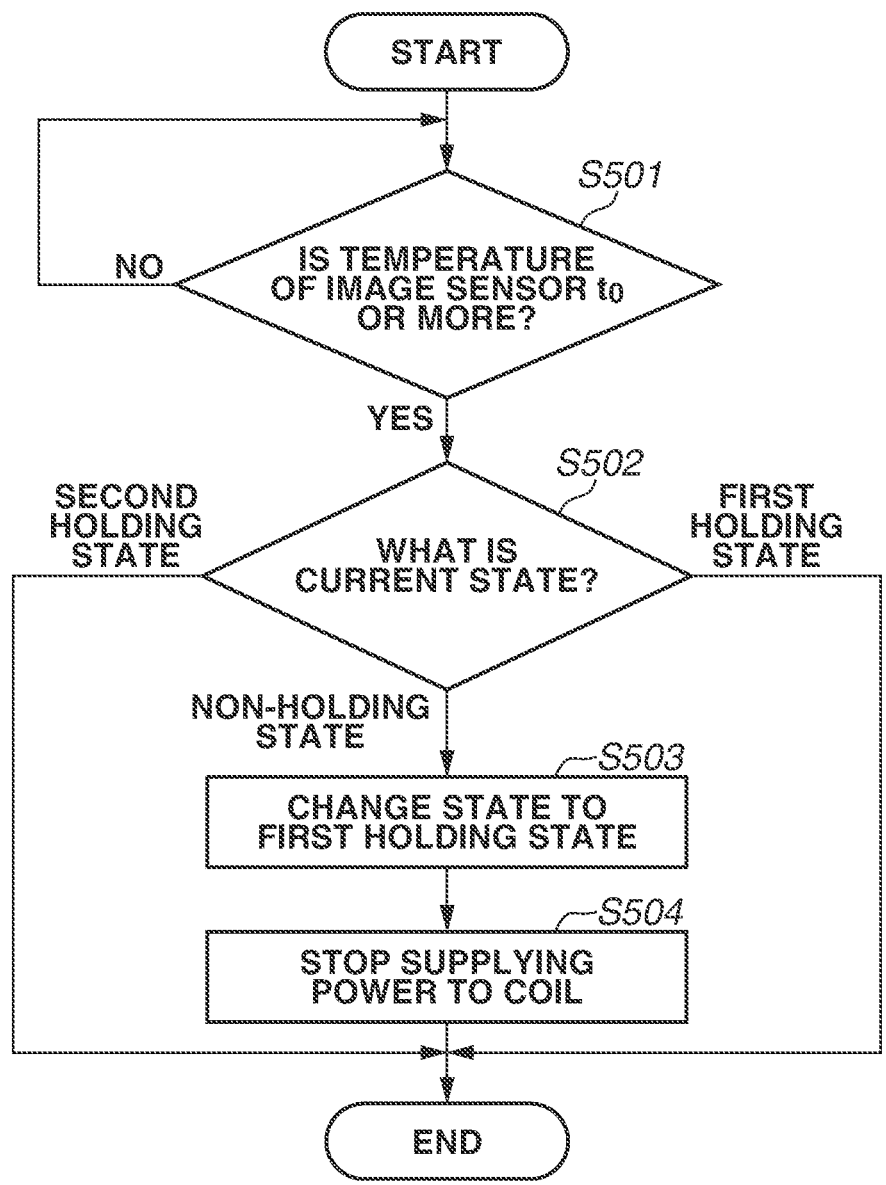
FIG. 10 is a flowchart illustrating processing to be executed by the digital camera when a temperature of an image sensor reaches a predetermined value or more.

Next, a description will be given of an example where the state of the image sensor lock mechanism 250 is changed depending on a temperature of the image sensor 231. FIG. 10 is a flowchart illustrating processing executed by the digital camera 100 when a temperature of the image sensor 231 has become a predetermined value or more. The processing illustrated in FIG. 10 is started when the digital camera 100 is turned on.

In step S501, the system control circuit 50 determines whether a measurement result acquired by the thermometer 58 is a predetermined value to or more. If the system control circuit 50 determines that the measurement result is less than the predetermined value to (NO in step S501), the system control circuit 50 repeatedly executes the determination until the measurement result becomes the predetermined value to or more.

The predetermined value to represents the upper limit temperature at which degradation of image quality caused by the heat from the image sensor 231 is prevented.

If the system control circuit 50 determines that a measurement result acquired by the thermometer 58 in step S501 is a predetermined value to or more (YES in step S501), the processing proceeds to step S502. In step S502, the system control circuit 50 determines a state of the image sensor lock mechanism 250.

In step S502, in a case where the system control circuit 50 determines that a state of the image sensor lock mechanism 250 is the non-holding state ("NON-HOLDING STATE" in step S502), the processing proceeds to step S503. In step S503, the system control circuit 50 controls the image sensor lock mechanism 250 to bring the image sensor lock mechanism 250 into the first holding state. In step S504, the system control circuit 50 stops the supply of power to the coils 243, and ends the processing for changing the holding state of the image sensor lock mechanism 250 executed when a temperature of the image sensor 231 rises.

In step S502, in a case where the system control circuit 50 determines that the state of the image sensor lock mechanism 250 is the first holding state or the second holding state ("FIRST HOLDING STATE" or "SECOND HOLDING STATE" in step S502), the processing ends without changing the state of the image sensor lock mechanism 250.

As described above, in a case where the temperature of the image sensor 231 has become a predetermined value or more, a rise in the temperature of the image sensor 231 can be suppressed by dissipating heat to the chassis 150 via the image sensor lock mechanism 250 and the heat-transfer member 170. Further, by using the temperature of the image sensor 231 as a condition for making a determination, it is possible to precisely determine whether heat is to be dissipated from the image sensor 231.

Figure 11:
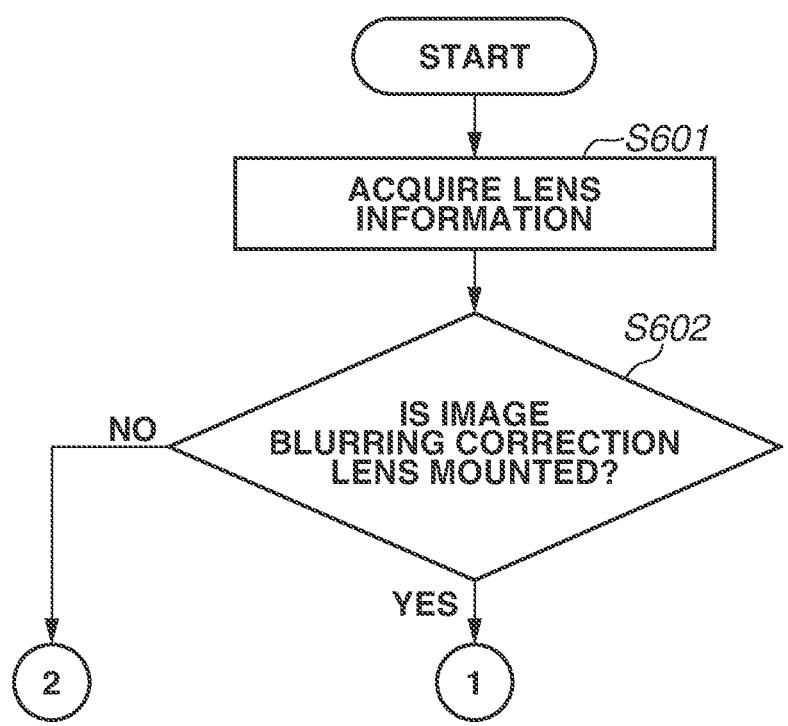
FIG. 11 is a flowchart illustrating processing to be executed depending on whether a lens having an image blurring correction function is mounted on the digital camera.

Next, a description will be given of an example where the state of the image sensor lock mechanism 250 is changed depending on a mounted image capturing lens 20. FIG. 11 is a flowchart illustrating processing to be executed depending on whether a lens having an image blurring correction function is mounted on the digital camera 100. The processing illustrated in FIG. 11 is started when the image capturing lens 20 is attached to the digital camera 100.

In step S601, the system control circuit 50 acquires lens information about the image capturing lens 20 mounted on the digital camera 100. The lens information includes pieces of information about a focal distance, an F-number, additional function such as an image blurring correction function, and individual difference.

In step S602, the system control circuit 50 determines whether the image capturing lens 20 has an image blurring correction function. In a case where the system control circuit 50 determines that the image capturing lens 20 has the image blurring correction function (YES in step S602), the processing proceeds to step S103 in FIG. 6. In a case where the system control circuit 50 determines that the image capturing lens 20 does not have the image blurring correction function (NO in step S602), the processing proceeds to step S109 in FIG. 6.

As described above, in a case where the image capturing lens 20 has the image blurring correction function, the operation of the image blurring correction unit 240 is stopped to save the power consumption of the digital camera 100. Because the image capturing lens 20 has the image blurring correction function, the power consumption of the digital camera 100 can be suppressed while image blurring is corrected by the image capturing lens 20.

Figure 12:
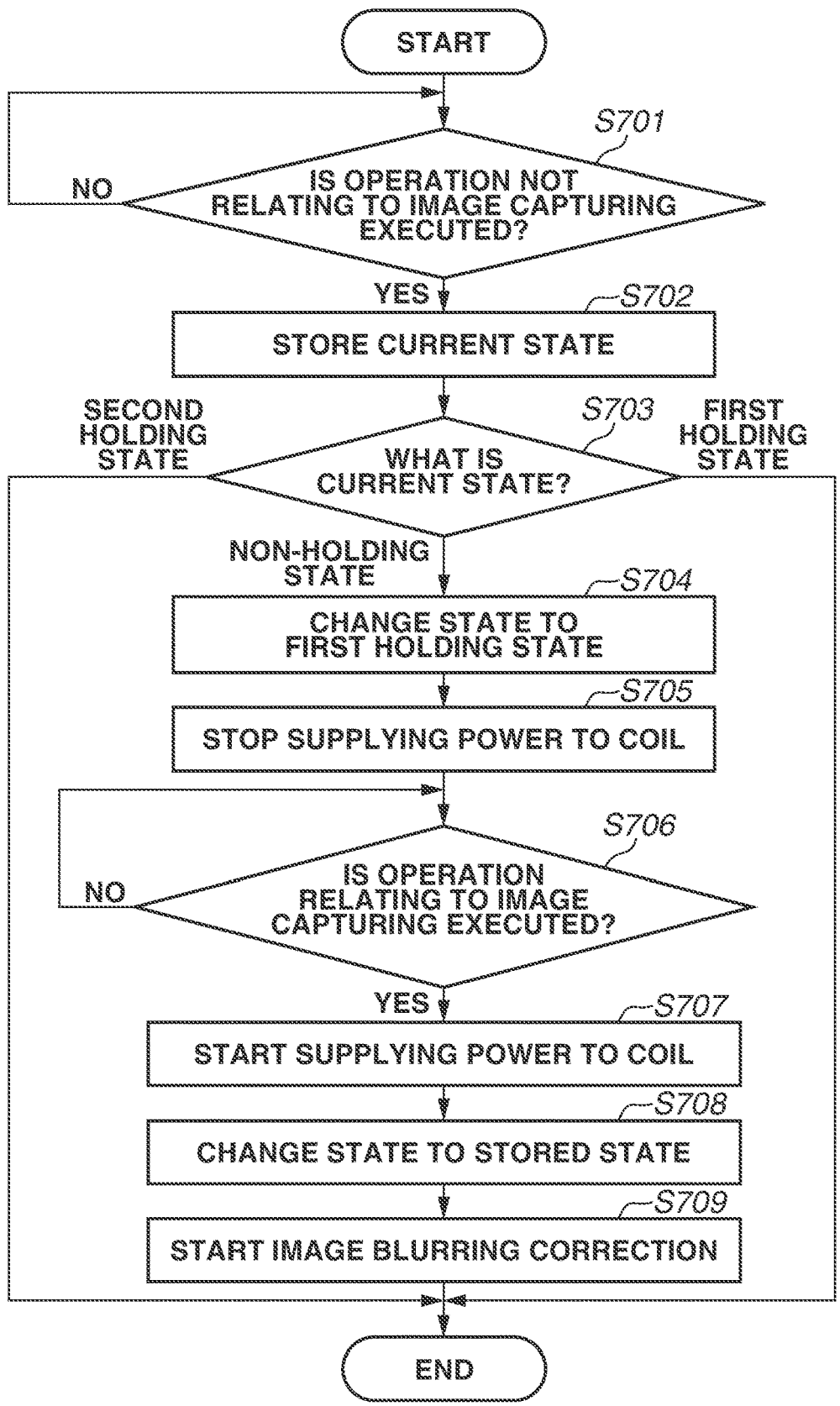
FIG. 12 is a flowchart illustrating processing to be executed when an operation not relating to image capturing is executed.

Next, a description will be given of processing in which the state of the image sensor lock mechanism 250 is changed by an operation not relating to image capturing such as reproduction of image data. FIG. 12 is a flowchart illustrating processing to be executed when an operation not relating to image capturing is executed on the digital camera 100. The processing illustrated in FIG. 12 is started when the digital camera 100 is turned on.

In step S701, the system control circuit 50 determines whether the user operates the operation member 80 to execute an operation not relating to image capturing. In a case where the system control circuit 50 determines that an operation relating to image capturing is executed (NO in step S701), the system control circuit 50 repeatedly executes the determination until the operation not relating to image capturing is executed.

In step S701, in a case where the system control circuit 50 determines that an operation not relating to image capturing is executed (YES in step S701), the processing proceeds to step S702. In step S702, the system control circuit 50 stores the state of the image sensor lock mechanism 250 in the memory 52.

In step S703, the system control circuit 50 determines a state of the image sensor lock mechanism 250.

In step S703, in a case where the system control circuit 50 determines that the state of the image sensor lock mechanism 250 is the non-holding state ("NON-HOLDING STATE" in step S703), the processing proceeds to step S704. In step S704, the system control circuit 50 controls the image sensor lock mechanism 250 to bring the image sensor lock mechanism 250 into the first holding state. Then, in step S705, the system control circuit 50 stops the supply of power to the coils 243.

In step S706, the system control circuit 50 determines whether the user operates the operation member 80 to execute an operation relating to image capturing. An operation relating to image capturing is, for example, an image capturing preparation operation such as an operation for changing an image capturing condition, and an image capturing operation. In a case where the system control circuit 50 determines that an operation not relating to image capturing is executed (NO in step S706), the system control circuit 50 repeatedly executes the determination until an operation relating to image capturing is executed.

In step S706, in a case where the system control circuit 50 determines that an operation relating to image capturing is executed (YES in step S706), the processing proceeds to step S707. In step S707, the system control circuit 50 starts the supply of power to the coils 243. Then, in step S708, the system control circuit 50 controls the image sensor lock mechanism 250 to bring the image sensor lock mechanism 250 into the non-holding state.

Then, in step S709, the system control circuit 50 starts the operation of the image blurring correction unit 240.

In step S703, in a state where the system control circuit 50 determines that the state of the image sensor lock mechanism 250 is the first holding state or the second holding state ("FIRST HOLDING STATE" or "SECOND HOLDING STATE" in step S703), the processing ends without changing the state of the image sensor lock mechanism 250.

As described above, since the image sensor lock mechanism 250 is brought into the holding state when an operation not relating to image capturing is executed, it is possible to suppress the power consumption of the digital camera 100. Further, the state of the image sensor lock mechanism 250 before being changed is stored, and the state of the image sensor lock mechanism 250 is brought back into the stored state when any operation relating to image capturing is executed. With this configuration, even if any operation not relating to image capturing is executed in the middle of image capturing, the digital camera 100 can return to the image capturing without causing the user to feel a sense of discomfort.

Figure 13A:
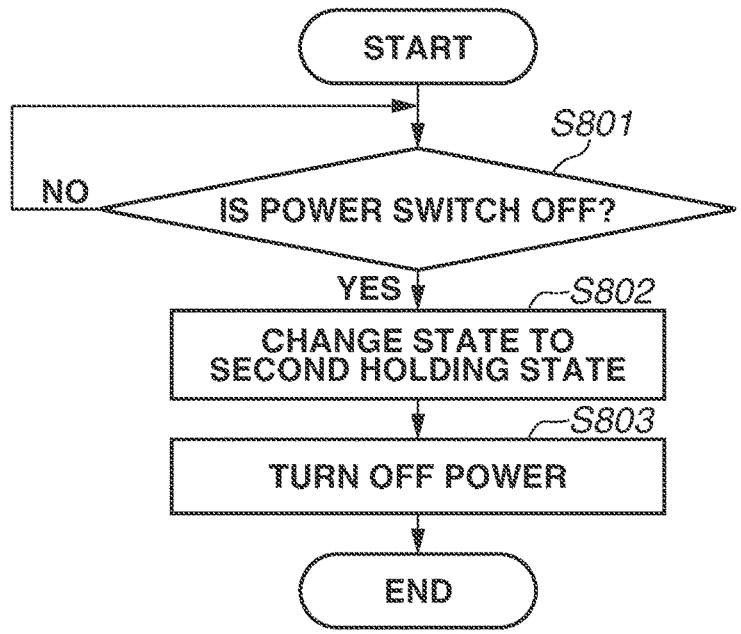
FIGS. 13A and 13B are flowcharts illustrating processing to be executed when a power switch of the digital camera is changed.
Figure 13B:
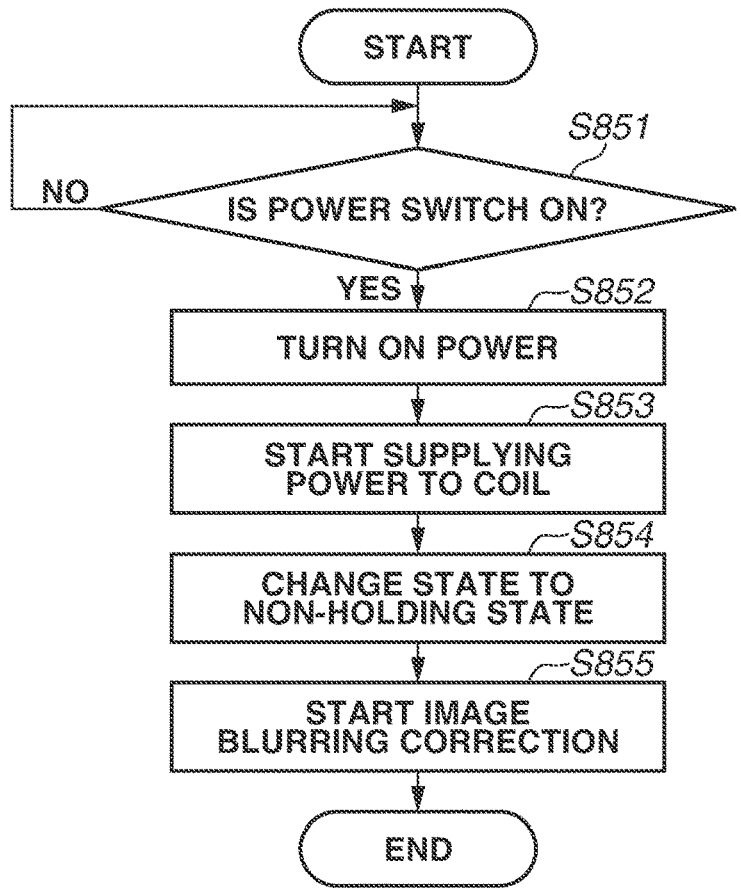

Further, in the above-described present exemplary embodiment, although the state of the image sensor lock mechanism 250 is changed to the first holding state from the non-holding state, the state of the image sensor lock mechanism 250 may be changed to the second holding state from the non-holding state instead. Next, a description will be given of an example in which the state of the image sensor lock mechanism 250 is changed when the power state of the digital camera 100 is changed. FIGS. 13A and 13B are flowcharts illustrating processing to be executed when the power state of the digital camera 100 is changed. The flowchart in FIG. 13A illustrates the processing to be executed when the power state of the digital camera 100 is changed to a power-off state from a power-on state, and the flowchart in FIG. 13B illustrates the processing to be executed when the power state of the digital camera 100 is changed to the power-on state from the power-off state. First, the processing illustrated in FIG. 13A will be described.

In step S801, the system control circuit 50 determines whether a state of the power switch 84 is changed to a power-off state from a power-on state. In a case where the system control circuit 50 determines that the power switch 84 remains in the power-on state (NO in step S801), the system control circuit 50 repeatedly executes the determination until the power switch 84 is turned off.

In step S801, in a case where the system control circuit 50 determines that the power switch 84 is turned off (YES in step S801), the processing proceeds to step S802. In step S802, the system control circuit 50 controls the image sensor lock mechanism 250 to bring the image sensor lock mechanism 250 into the second holding state. Next, in step S803, the system control circuit 50 controls the power control circuit 86 to stop the supply of power from the battery 88.

As described above, when the power state is changed to the power-off state from the power-on state, the image sensor lock mechanism 250 is brought into the second holding state. In this way, the impact-resistance at the periphery of the image capturing unit 200 can be improved, so that breakage of the image sensor unit 230 can be minimized even if impact is applied to the digital camera 100 from the outside.

Subsequently, the processing illustrated in FIG. 13B will be described. In step S851, the system control circuit 50 determines whether the state of the power switch 84 is changed to a power-on state from a power-off state. In a case where the system control circuit 50 determines that the power switch 84 remains in the power-off state (NO in step S851), the system control circuit 50 repeatedly executes the determination until the power switch 84 is turned on.

In step S851, in a case where the system control circuit 50 determines that the power switch 84 is turned on (YES in step S851), the processing proceeds to step S852. In step S852, the system control circuit 50 controls the power control circuit 86 to restart the supply of power from the battery 88. Then in step S853, the system control circuit 50 starts the supply of power to the coils 243. In step S854, the system control circuit 50 controls the image sensor lock mechanism 250 to bring the image sensor lock mechanism 250 into the non-holding state. Then in step S855, the system control circuit 50 starts the operation of the image blurring correction unit 240.

As described above, the image sensor lock mechanism 250 is brought into the non-holding state when the power state is changed to the power-on state from the power-off state, so that the digital camera 100 can quickly be ready for an image capturing operation.

Figure 14:
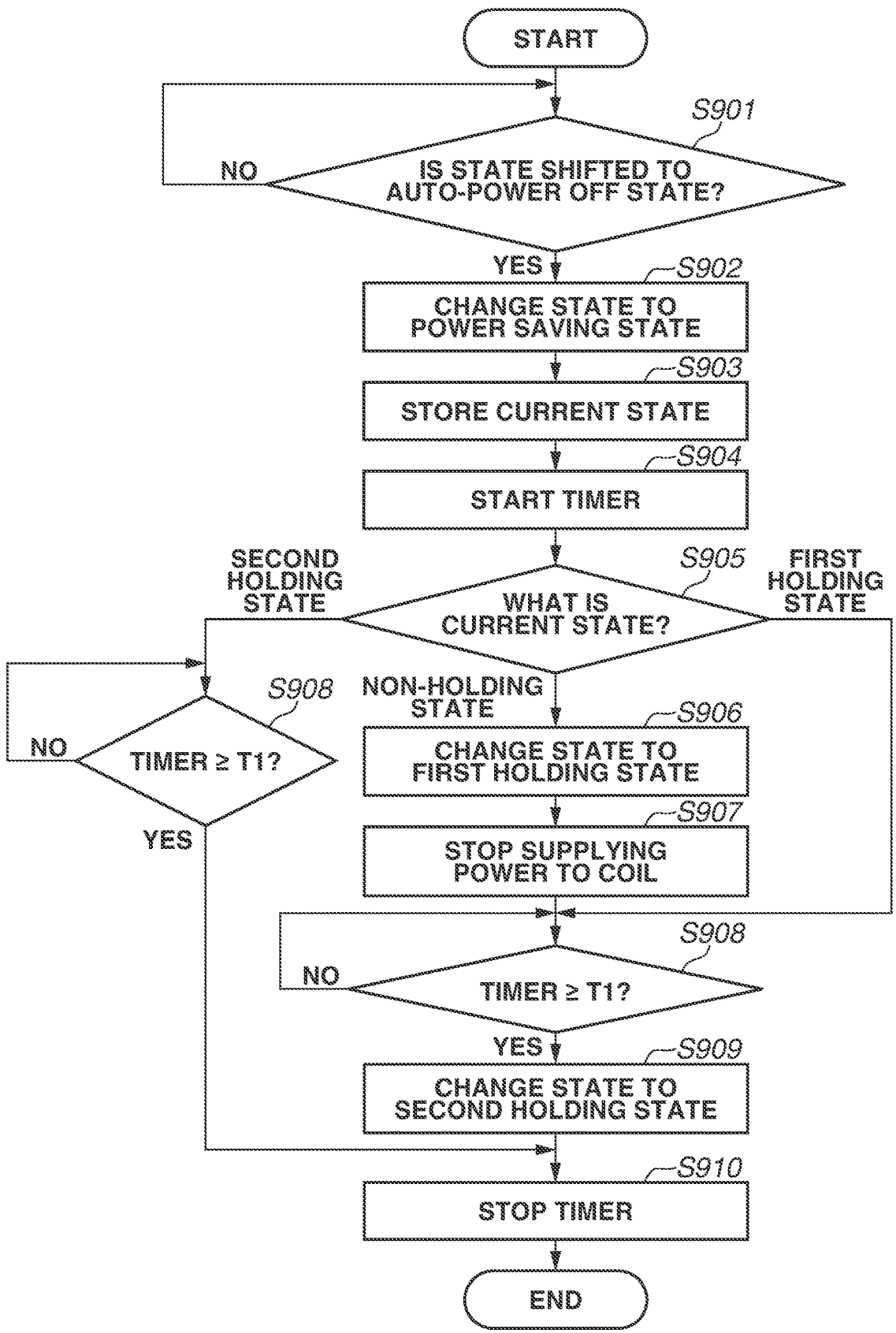
FIG. 14 is a flowchart illustrating processing to be executed when a state of the digital camera is changed to an auto-power off state.
Figure 15:
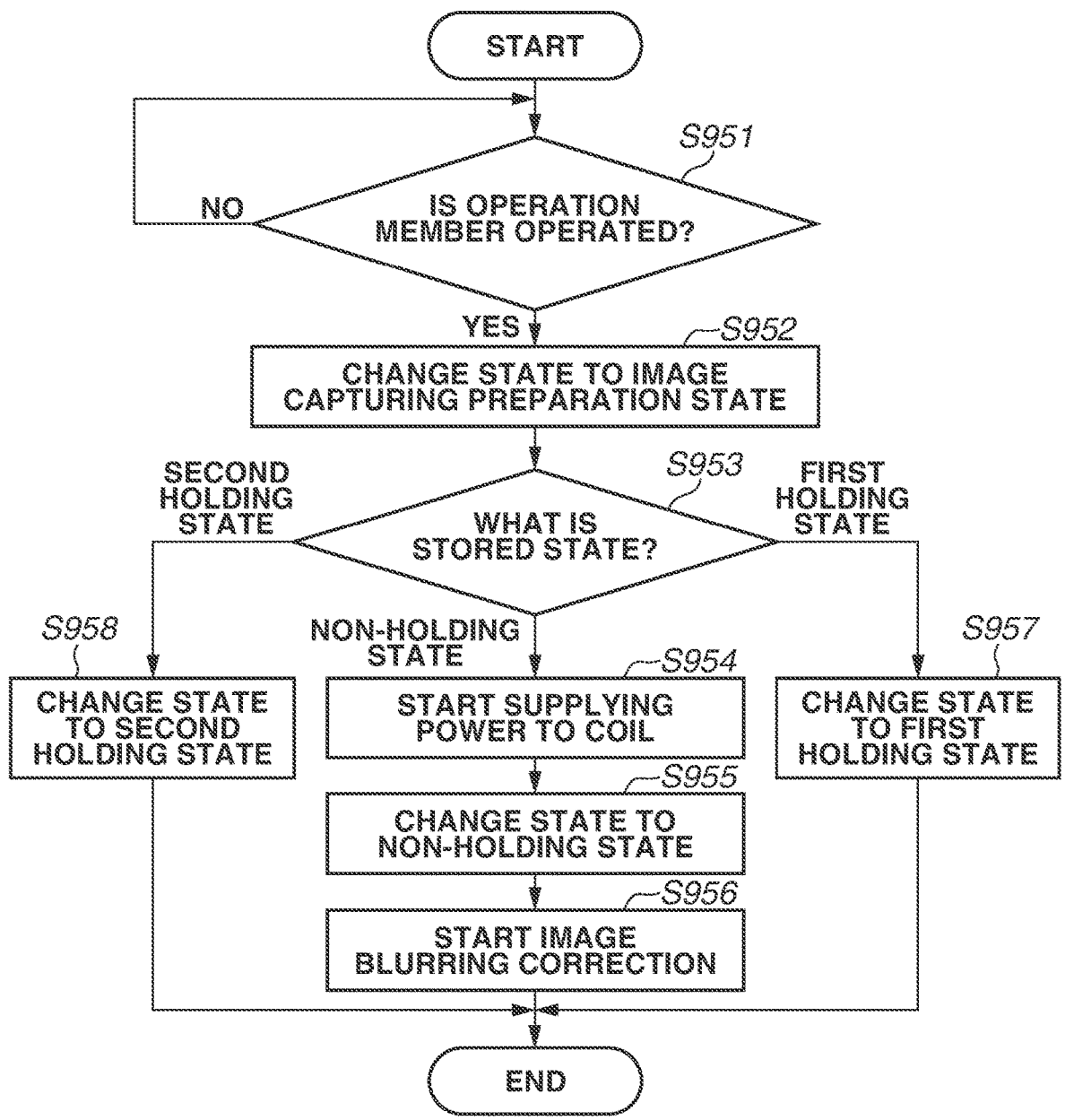
FIG. 15 is a flowchart illustrating processing to be executed when a state of the digital camera is changed from the auto-power off state.

Next, a description will be given of processing for changing the state of the image sensor lock mechanism 250 in a case where the state of the digital camera 100 is changed due to an auto power-off function. When the digital camera 100 is brought into the auto-power off state, the state of the digital camera 100 can be changed to a power saving state where the power consumption is lower than the power consumption in a normal state such as an image capturing preparation state. FIG. 14 is a flowchart illustrating the processing to be executed when the state of the digital camera 100 is changed to the auto-power off state from the image capturing preparation state. FIG. 15 is a flowchart illustrating the processing to be executed when the state of the digital camera 100 is changed to the image capturing preparation state from the auto-power off state.

First, the processing to be executed when the state of the digital camera 100 is changed to the auto-power off state from the image capturing preparation state will be described with reference to FIG. 14. In step S901, the system control circuit 50 determines whether the digital camera 100 is brought into the auto-power off state without being operated by the user for a predetermined time. If the system control circuit 50 determines that the digital camera 100 remains in the image capturing preparation state (NO in step S901), the system control circuit 50 repeatedly executes the determination until the state of the digital camera 100 is changed to the auto-power off state.

In step S901, in a case where the system control circuit 50 determines that the digital camera 100 is in the auto-power off state (YES in step S901), the processing proceeds to step S902. In step S902, the system control circuit 50 controls the power control circuit 86 to shift the state of the digital camera 100 to the power saving state where the power consumption is lower than the power consumption in the image capturing preparation state.

In step S903, the system control circuit 50 stores the state of the image sensor lock mechanism 250 in the memory 52. In step S904, the system control circuit 50 starts the timer 56. In step S905, the system control circuit 50 determines a state of the image sensor lock mechanism 250.

In step S905, in a case where the system control circuit 50 determines that the state of the image sensor lock mechanism 250 is the non-holding state ("NON-HOLDING STATE" in step S905), the processing proceeds to step S906. In step S906, the system control circuit 50 controls the image sensor lock mechanism 250 to bring the image sensor lock mechanism 250 into the first holding state. Further, in step S907, the system control circuit 50 stops the supply of power to the coils 243.

In step S908, the system control circuit 50 determines whether the elapsed time measured by the timer 56 is a predetermined time T1 or more. In a case where the system control circuit 50 determines that the elapsed time is less than the predetermined time T1 (NO in step S908), the system control circuit 50 repeatedly executes the determination until the elapsed time becomes the predetermined time T1 or more.

In step S908, in a case where the system control circuit 50 determines that the predetermined time T1 has elapsed, i.e., the elapsed time is the predetermined time T1 or more, (YES in step S908), the processing proceeds to step S909. In step S909, the system control circuit 50 controls the image sensor lock mechanism 250 to bring the image sensor lock mechanism 250 into the second holding state. Next, in step S910, the system control circuit 50 stops the timer 56, and ends the processing for changing the holding state of the image sensor lock mechanism 250 executed when the state of the digital camera 100 is changed to the auto-power off state.

In step S905, in a case where the system control circuit 50 determines that the state of the image sensor lock mechanism 250 is the first holding state ("FIRST HOLDING STATE" in step S905), the processing proceeds to step S908. In step S905, in a case where the system control circuit 50 determines that the state of the image sensor lock mechanism 250 is the second holding state ("SECOND HOLDING STATE" in step S905), the processing proceeds to step S911. In step S911, the system control circuit 50 determines whether the elapsed time measured by the timer 56 is the predetermined time T1 or more. In a case where the system control circuit 50 determines that the predetermined time T1 has not elapsed (NO in step S911), the system control circuit 50 repeatedly executes the determination until the predetermined time T1 has elapsed. If the system control circuit 50 determines that the predetermined time T1 has elapsed, (YES in step S911), the processing proceeds to step S910.

As described above, the holding state of the image sensor lock mechanism 250 is changed based on time that has elapsed after the digital camera 100 is brought into the auto-power off state. The image sensor lock mechanism 250 is kept in the first holding state until the predetermined time T1 elapses after the state of the digital camera 100 is shifted to the auto-power off state, so that the digital camera 100 can easily return to the image capturing operation. Then, when the predetermine time T1 has elapsed, the image sensor lock mechanism 250 is brought into the second holding state, so that resistance to impact caused by an external force can be improved.

Next, the processing to be executed when the state of the digital camera 100 is changed to the image capturing preparation state from the auto-power off state will be described with reference to FIG. 15. In step S951, the system control circuit 50 determines whether the user operates the operation member 80. In a case where the system control circuit 50 determines that the operation member 80 is not operated and the digital camera 100 remains in the auto-power off state (NO in step S951), the system control circuit 50 repeatedly executes the determination until the state of the digital camera 100 is changed to the image capturing preparation state.

In step S951, in a case where the system control circuit 50 determines that the user operates the operation member 80 (YES in step S951), the processing proceeds to step S952. In step S952, the system control circuit 50 controls the power control circuit 86 to change the state of the digital camera 100 to the image capturing preparation state from the power saving state.

In step S953, the system control circuit 50 determines the state stored in the memory 52 in step S903. In step S953, in a case where the system control circuit 50 determines that the stored state is the non-holding state ("NON-HOLDING STATE" in step S953), the processing proceeds to step S954. In step S954, the system control circuit 50 starts the supply of power to the coils 243. Then in step S955, the system control circuit 50 controls the image sensor lock mechanism 250 to bring the image sensor lock mechanism 250 into the non-holding state.

In step S956, the system control circuit 50 starts the operation of the image blurring correction unit 240, and then ends the processing for changing the holding state of the image sensor lock mechanism 250 executed when the state of the digital camera 100 is changed from the auto-power off state.

In step S953, in a case where the system control circuit 50 determines that the stored state is the first holding state ("FIRST HOLDING STATE" in step S953), the processing proceeds to step S957. In step S957, the system control circuit 50 controls the image sensor lock mechanism 250 to bring the image sensor lock mechanism 250 into the first holding state. In a case where the image sensor lock mechanism 250 is in the first holding state when the state of the digital camera 100 is the auto-power off state, the processing ends without changing the state of the image sensor lock mechanism 250.

In step S953, in a case where the system control circuit 50 determines that the stored state is the second holding state ("SECOND HOLDING STATE" in step S953), the processing proceeds to step S958. In step S958, the system control circuit 50 controls the image sensor lock mechanism 250 to bring the image sensor lock mechanism 250 into the second holding state. In a case where the image sensor lock mecha- nism 250 is in the first holding state when the state of the digital camera 100 is the auto-power off state, the processing ends without changing the state of the image sensor lock mechanism 250.

As described above, the state of the image sensor lock mechanism 250 before the digital camera 100 is brought into the auto-power off state is stored. Then, when the state of the digital camera 100 is changed to the image capturing preparation state, the image sensor lock mechanism 250 is brought back to the stored state. In this way, the digital camera 100 can return to the image capturing operation without causing the user to feel a sense of discomfort.

Next, a description will be given of processing for changing the state of the image sensor lock mechanism 250 to remove dust adhered to the surface of the image sensor 231.

Figure 16:
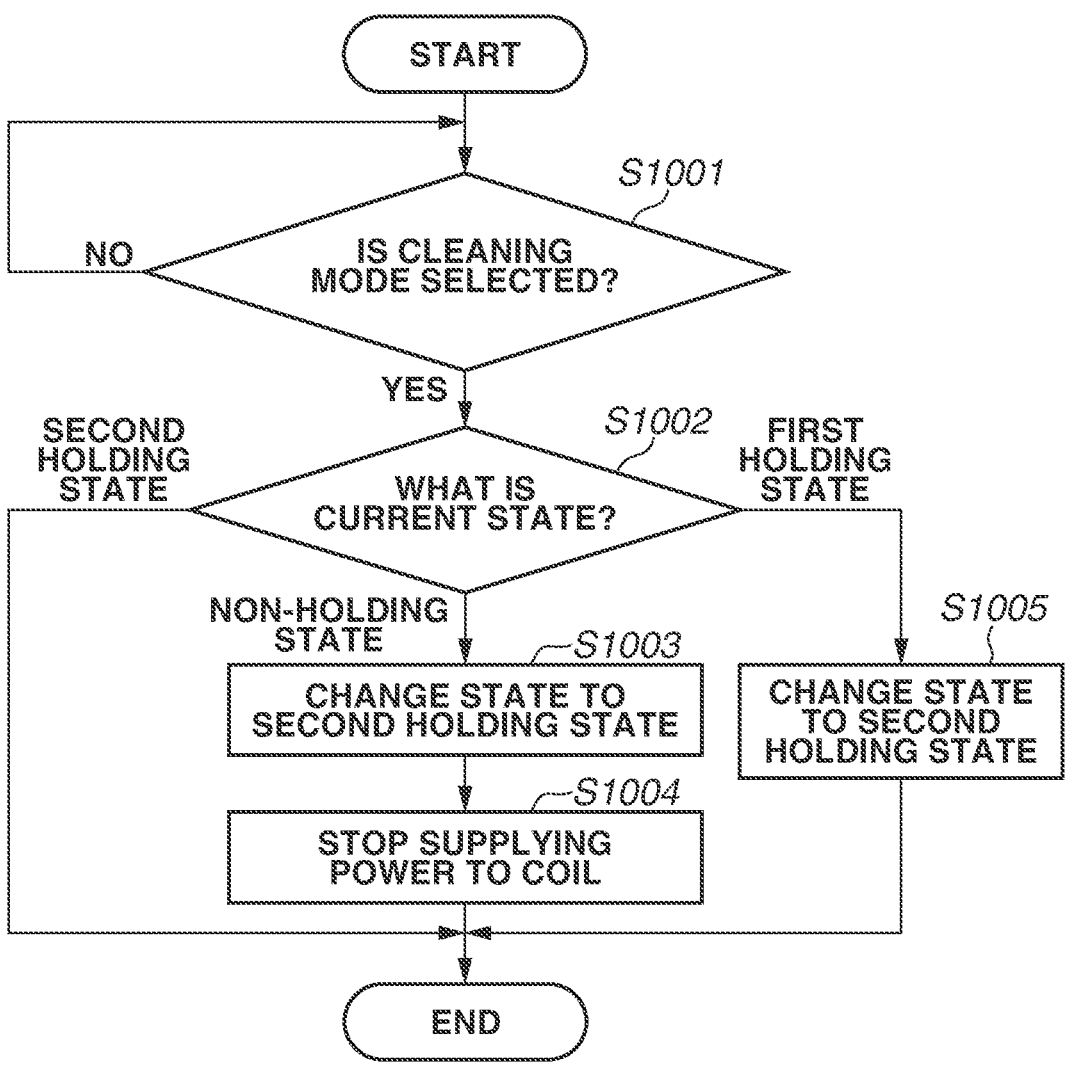
FIG. 16 is a flowchart illustrating processing to be executed when an image sensor cleaning mode is set to the digital camera.

FIG. 16 is a flowchart illustrating processing to be executed when the digital camera 100 is set to an image sensor cleaning mode. In the image sensor cleaning mode, all of mechanisms located on the front side of the image sensor 231 are open, so that the user can clean the image sensor 231 from the outside of the digital camera 100 either by hand or by using a device. The processing illustrated in FIG. 16 is started when the digital camera 100 is turned on.

In step S1001, the system control circuit 50 determines whether the user operates the operation member 80 to set the image sensor cleaning mode. In a case where the system control circuit 50 determines that the user does not set the image sensor cleaning mode (NO in step S1001), the system control circuit 50 repeatedly executes the determination until the image sensor cleaning mode is set.

In step S1001, in a case where the system control circuit 50 determines that the user sets the image sensor cleaning mode (YES in step S1001), the processing proceeds to step S1002. In step S1002, the system control circuit 50 determines a state of the image sensor lock mechanism 250.

In step S1002, in a case where the system control circuit 50 determines that the state of the image sensor lock mechanism 250 is the non-holding state ("NON-HOLDING STATE" in step S1002), the processing proceeds to step S1003. In step S1003, the system control circuit 50 controls the image sensor lock mechanism 250 to bring the image sensor lock mechanism 250 into the second holding state. Further, in step S1004, the system control circuit 50 stops the supply of power to the coils 243, and ends the processing for changing the state of the image sensor lock mechanism 250 for the image sensor cleaning mode.

In step S1002, in a case where the system control circuit 50 determines that the state of the image sensor lock mechanism 250 is the first holding state ("FIRST HOLDING STATE" in step S1002), the processing proceeds to step S1005. In step S1005, the system control circuit 50 controls the image sensor lock mechanism 250 to bring the image sensor lock mechanism 250 into the second holding state, and ends the processing for changing the state of the image sensor lock mechanism 250 for the image sensor cleaning mode.

In step S1002, in a case where the system control circuit 50 determines that the state of the image sensor lock mechanism 250 is the second holding state ("SECOND HOLDING STATE" in step S1002), the processing ends without changing the state of the image sensor lock mechanism 250.

As described above, the image sensor lock mechanism 250 is kept in the second holding state when the user sets the image sensor cleaning mode. With this configuration, the position of the image sensor unit 230 can be fixed even if external force caused by the cleaning work is applied thereto, so that cleaning workability can be improved.

Although the exemplary embodiment of the disclosure has been described above, the disclosure is not limited to the above exemplary embodiments, and many variations and modifications are possible within the scope of the disclosure.

For example, the examples of how to change the state of the image sensor lock mechanism 250 described in the above exemplary embodiment can be executed in combination.

Further, the configuration of the image sensor lock mechanism 250 is not limited to the above-described configuration. For example, any configuration is possible as long as the intensity of holding force applied when the image sensor lock mechanism 250 holds the image sensor unit 230 can be changed gradually, and the power consumption when the image sensor unit 230 is held by the image sensor lock mechanism 250 can be lower than the power consumption when the position of the image sensor unit 230 is fixed by the coils 243.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-030208, filed Feb. 26, 2021, which is hereby incorporated by reference herein in its entirety.

What is claimed is:

1. An apparatus comprising:
a sensor;
a movable portion configured to hold the sensor and move in a direction perpendicular to an axis;
a holding unit configured to gradually change a holding force for holding the movable portion by moving back and forth in the direction of the axis; and
a control unit configured to control the holding force of the holding unit for holding the movable portion depending on a state of the apparatus.

2. The apparatus according to claim 1, wherein the control unit controls the holding force of the holding unit to bring the holding unit into any one of a non-holding state where the movable portion is not held by the holding unit, a first holding state where the movable portion is held by the holding unit with a first holding force, and a second holding state where the movable portion is held by the holding unit with a second holding force stronger than the first holding force, depending on the state of the apparatus.

3. The apparatus according to claim 2, wherein the holding unit is connected to a housing or a heat-transfer member.

4. The apparatus according to claim 3, wherein the control unit controls the holding force of the holding unit for holding the movable portion depending on power consumption of the apparatus.

5. The apparatus according to claim 4, wherein the control unit controls the holding force of the holding unit to bring the holding unit into the first holding state in a case where the power consumption of the apparatus is a predetermined value or more.

6. The apparatus according to claim 3, further comprising a setting unit configured to set a mode of the apparatus,
wherein the control unit controls the holding force of the holding unit for holding the movable portion depending on the set mode.

7. The apparatus according to claim 6,
wherein the apparatus has a capturing mode, and
wherein the control unit controls the holding force of the holding unit to bring the holding unit into the first holding state in a case where the capturing mode is set by the setting unit.

8. The apparatus according to claim 6,
wherein the apparatus has a cleaning mode, and
wherein the control unit controls the holding force of the holding unit to bring the holding unit into the second holding state in a case where the cleaning mode is set by the setting unit.

9. The apparatus according to claim 6,
wherein the apparatus has a recording mode for recording acquired data in a plurality of recording media, and
wherein the control unit controls the holding force of the holding unit to bring the holding unit into the first holding state in a case where the recording mode is set by the setting unit.

10. The apparatus according to claim 3, further comprising a communication unit configured to communicate with an external device,
wherein the control unit controls the holding force of the holding unit to bring the holding unit into the first holding state when the apparatus communicates with the external device through the communication unit.

11. The apparatus according to claim 3, further comprising a measurement unit configured to measure a temperature of the sensor,
wherein the control unit controls the holding force of the holding unit for holding the movable portion depending on the temperature of the apparatus measured by the measurement unit.

12. The apparatus according to claim 11, wherein the control unit controls the holding force of the holding unit to bring the holding unit into the first holding state in a case where the measured temperature of the image capturing apparatus is a predetermined value or more.

13. The apparatus according to claim 1, wherein the control unit controls the holding force of the holding unit to bring the holding unit into the second holding state in a case where the state of the apparatus is changed to a power off state from a power on state.

14. The apparatus according to claim 3,
wherein the state of the apparatus is changeable to a power saving state, and
wherein the control unit controls the holding force of the holding unit for holding the movable portion depending on time that elapses after the state of the apparatus is changed to the power saving state.

15. The apparatus according to claim 14, wherein the control unit controls the holding force of the holding unit to bring the holding unit into the first holding state when the time that elapses after the state of the apparatus is changed to the power saving state is less than a predetermined time, and controls the holding force of the holding unit to bring the holding unit into the second holding state when the elapsed time is the predetermined time or more.

16. The apparatus according to claim 1, wherein the sensor is an image sensor.

17. A method of an apparatus including
a sensor,
a movable portion configured to hold the sensor and move in a direction perpendicular to an optical axis, and
a holding unit configured to gradually change a holding force for holding the movable portion by moving back and forth in the direction of the optical axis,
the method comprising:
controlling the holding force of the holding unit for holding the movable portion depending on a state of the apparatus.

18. The method according to claim 17, wherein the controlling controls the holding force of the holding unit to bring the holding unit into any one of a non-holding state where the movable portion is not held by the holding unit, a first holding state where the movable portion is held by the holding unit with a first holding force, and a second holding state where the movable portion is held by the holding unit with a second holding force stronger than the first holding force, depending on the state of the apparatus.

19. The method according to claim 18, wherein the holding unit is connected to a housing or a heat-transfer member.

20. The method according to claim 19, wherein the controlling controls the holding force of the holding unit for holding the movable portion depending on power consumption of the apparatus.

* * * * *